United States Patent
Mihan

(10) Patent No.: US 8,563,674 B2
(45) Date of Patent: *Oct. 22, 2013

(54) POLYETHYLENE AND CATALYST COMPOSITION FOR ITS PREPARATION

(75) Inventor: Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 99 days.

This patent is subject to a terminal disclaimer.

(21) Appl. No.: 12/800,998

(22) Filed: May 27, 2010

(65) Prior Publication Data

US 2010/0311925 A1     Dec. 9, 2010

Related U.S. Application Data

(62) Division of application No. 11/578,753, filed as application No. PCT/EP2005/051826 on Apr. 25, 2005, now Pat. No. 7,767,613.

(60) Provisional application No. 60/587,533, filed on Jul. 13, 2004.

(30) Foreign Application Priority Data

Apr. 26, 2004  (DE) .................. 10 2004 020 524

(51) Int. Cl.
    *C08F 10/02*        (2006.01)
(52) U.S. Cl.
    USPC ........... 526/352; 526/113; 526/114; 526/115; 526/117; 526/348.2; 526/348; 526/348.6
(58) Field of Classification Search
    USPC .............. 526/352, 113, 114, 115, 117, 348.2, 526/348, 348.6
    See application file for complete search history.

(56) References Cited

U.S. PATENT DOCUMENTS

| | | | |
|---|---|---|---|
| 3,125,547 A | 3/1964 | Blatz | |
| 3,242,150 A | 3/1966 | Scoggin | |
| 3,248,179 A | 4/1966 | Norwood | |
| 4,438,238 A | 3/1984 | Fukushima et al. | |
| 5,350,807 A | 9/1994 | Pettijohn et al. | |
| 5,565,534 A | 10/1996 | Aulbach et al. | |
| 5,710,297 A | 1/1998 | Weller et al. | |
| 5,770,753 A | 6/1998 | Küber et al. | |
| 5,786,432 A | 7/1998 | Küber et al. | |
| 5,840,644 A | 11/1998 | Kuber et al. | |
| 5,840,948 A | 11/1998 | Rohrmann et al. | |
| 5,852,142 A | 12/1998 | Rohrmann et al. | |
| 5,908,679 A | 6/1999 | Berthold et al. | |
| 5,929,264 A | 7/1999 | Rohrmann et al. | |
| 5,990,254 A | 11/1999 | Weller et al. | |
| 6,051,522 A | 4/2000 | Rohrmann et al. | |
| 6,051,727 A | 4/2000 | Kuber et al. | |
| 6,242,544 B1 | 6/2001 | Kuber et al. | |
| 6,255,506 B1 | 7/2001 | Kuber et al. | |
| 6,339,134 B1 | 1/2002 | Crowther et al. | |
| 6,410,664 B1 | 6/2002 | Bansleben et al. | |
| 6,417,302 B1 | 7/2002 | Bohnen | |
| 6,437,161 B1 | 8/2002 | Mihan et al. | |
| 6,455,660 B1 | 9/2002 | Clutton et al. | |
| 6,642,313 B1 | 11/2003 | Kazakov et al. | |
| 6,699,948 B2 | 3/2004 | Mihan et al. | |
| 6,787,498 B2 | 9/2004 | Mihan et al. | |
| 6,812,185 B2 | 11/2004 | Fischer et al. | |
| 6,838,563 B2 | 1/2005 | Mihan et al. | |
| 6,919,412 B1 | 7/2005 | Mihan et al. | |
| 7,053,160 B1 | 5/2006 | Bingel et al. | |
| 7,534,847 B2 * | 5/2009 | Mihan et al. .................. | 526/348 |
| 7,666,959 B2 | 2/2010 | Razavi | |
| 7,737,230 B2 | 6/2010 | Mihan et al. | |
| 7,928,051 B2 * | 4/2011 | Kipke et al. .................. | 510/352 |
| 8,222,356 B2 | 7/2012 | Kipke et al. | |
| 2002/0058584 A1 | 5/2002 | Bennett et al. | |
| 2003/0036658 A1 | 2/2003 | Mihan et al. | |
| 2003/0036662 A1 | 2/2003 | Mihan et al. | |
| 2003/0055267 A1 | 3/2003 | Mihan et al. | |
| 2003/0125195 A1 | 7/2003 | Britovsek et al. | |

FOREIGN PATENT DOCUMENTS

| | | |
|---|---|---|
| EP | 100843 | 2/1984 |
| EP | 129368 | 12/1984 |
| EP | 90/03414 | 4/1990 |
| EP | 416815 | 3/1991 |

(Continued)

OTHER PUBLICATIONS

George J. P. Britovsek, Vernon C. Gibson, and Duncan F. Wass, "The Search for New-Generation Olefin Polymerization Catalysts: Life beyond Metallocenes," *Angew Chem. Int. Ed.* 1999, 38, pp. 428-447.
L. Fieser & M. Fieser, "Heterocyclen," *Lehrbuch der Organischen Chemie*, Verlag Chemie, p. 921-941 (1957).
Y. Chen et al., "Halogen-Substituted 2,6-Bis(imino)pyridyl Iron and Cobalt Complexes: Highly Active Catalysts for Polymerization and Oligomerization of Ethylene," *Organometallics*, vol. 22, p. 4312-4321 (2003).
J. Ewen et al., "Expanding the Scope of Metallocene Catalysis: Beyond Indenyl and Fluorenyl Derivatives," p. 150-169 (1999).
L. Wild, "Temperature Rising Elution Fractionation," *Advances in Polymer Science 98*, p. 1-47 (1990).
James C. Randall, "A Review of High Resolution Liquid $^{13}$Carbon Nuclear Magnetic Resonance Characterizations of Ethylene-Based Polymers," *JMS-Rev. Macromol. Chem. Phys.*, C29(2&3), p. 201-317 (1989).

(Continued)

*Primary Examiner* — Robert D. Harlan

(57) ABSTRACT

Polyethylene which comprises ethylene homopolymers and copolymers of ethylene with α-olefins and has a molar mass distribution width $M_w/M_n$ of from 6 to 100, a density of from 0.89 to 0.97 g/cm$^3$, a weight average molar mass $M_w$ of from 5000 g/mol to 700 000 g/mol and has from 0.01 to 20 branches/1000 carbon atoms and at least 0.5 vinyl groups/1000 carbon atoms, wherein the 5-50% by weight of the polyethylene having the lowest molar masses have a degree of branching of less than 10 branches/1000 carbon atoms and the 5-50% by weight of the polyethylene having the highest molar masses have a degree of branching of more than 2 branches/1000 carbon atoms, a process for its preparation, catalysts suitable for its preparation and also fibers, moldings, films or polymer blends in which this polyethylene is present.

7 Claims, 2 Drawing Sheets

(56) References Cited

FOREIGN PATENT DOCUMENTS

| | | |
|---|---|---|
| EP | 420436 | 4/1991 |
| EP | 91/09882 | 7/1991 |
| EP | 533154 | 3/1993 |
| EP | 533155 | 3/1993 |
| EP | 533156 | 3/1993 |
| EP | 533160 | 3/1993 |
| EP | 545304 | 6/1993 |
| EP | 561479 | 9/1993 |
| EP | 576970 | 1/1994 |
| EP | 659758 | 6/1995 |
| EP | 661300 | 7/1995 |
| EP | 662989 | 7/1995 |
| EP | 728160 | 8/1996 |
| EP | 739937 | 10/1996 |
| EP | 1212333 | 6/2002 |
| JP | 2000-191719 A | 7/2000 |
| JP | 2001-192405 A | 7/2001 |
| JP | 2003-147009 A | 5/2003 |
| WO | 93/03093 | 2/1993 |
| WO | 95/11264 | 4/1995 |
| WO | 95/27005 | 10/1995 |
| WO | 96/00243 | 1/1996 |
| WO | 97/04015 | 2/1997 |
| WO | 98/03559 | 1/1998 |
| WO | 9822486 | 5/1998 |
| WO | 98/27124 | 6/1998 |
| WO | 98/40419 | 9/1998 |
| WO | 99/06414 | 2/1999 |
| WO | 99/46302 | 9/1999 |
| WO | WO 9950318 A1 | 10/1999 |
| WO | 00/05277 | 2/2000 |
| WO | 00/24787 | 5/2000 |
| WO | 00/31090 | 6/2000 |
| WO | 00/35928 | 6/2000 |
| WO | 01/12641 | 2/2001 |
| WO | 01/23443 | 4/2001 |
| WO | 01/41920 | 6/2001 |
| WO | WO 0144317 A1 | 6/2001 |
| WO | 03/003093 | 1/2003 |
| WO | 2004/018489 | 3/2004 |

OTHER PUBLICATIONS

R. Halterman, "Synthesis and Applications of Chiral Cyclopentadienylometal Complexes," *Chem. Rev.* vol. 92(5), p. 965-994 (1992).

G. Britovsek et al, "Novel olefin polymerization catalysts based on iron and cobalt," *Chem. Commun.*, p. 849-850 (1998).

B. Small et al, "Highly Active Iron and Cobalt Catalysts for the Polymerization of Ethylene," *J. Am. Chem. Soc.*, vol. 120(16), p. 4049-4050 (1998).

H. Wiesenfeldt et al., "*ansa*-Metallocene derivatives, XVII. Racemic and *meso* diastereomers of group IV metallocene derivatives with symmetrically substituted, dimethylsilanediyl-bridged ligand frameworks. Crystal structure of R,S-Me$_2$ Si(3-t-Bu-MeC$_5$ H$_2$ )$_2$ ZrCl$_2$ ," *Journal of Organometallic Chemistry*, vol. 369, p. 359-370 (1989).

M. Enders et al., "8-Quinolylcyclopentadienyl, a Ligand with a Tailored Fit for Chelate Complexes," *Chem. Ber.*, vol. 129, p. 459-463 (1996).

S. Strauss, "The Search for Larger and More Weakly Coordinating Anions," *Chem. Rev.*, vol. 93(3), p. 927-942 (1993).

P. Jutzi et al., "Cyclopentadienyl compounds with nitrogen donors in the side-chain," *Journal of Organometallic Chemistry 500*, p. 175-185 (1995).

S. Pang et al., "Size-Exclusion Chromatographic Assessment of Long-Chain Branch Frequency in Polyethylenes," *American Chemical Society*, Chapter 17, p. 254-269 (1993), ACS Symposium Series 521, *Chromatography of Polymers*, edited by T. Provder.

M. Rätzsch et at, "Bimodale Polymerwerkstoffe auf der Basis von PP und PE;" in *Aufbereiten von Polymeren mit neuartigen Eigenschaften*, VDI-Verlag, Dusseldorf, p. 3-25 (1995).

C. Herrmann et al, "Beeinflussung von titanhaltigen Polymerisations-katalysatoren durch zusätzliche Metalle," *Die Augewandte Makromoleckulare Chemie 94*, p. 91-104 (1981).

L. Böhm et al., "High-Density Polyethylene Pipe Resins," *Advanced Materials 4*, No. 3, p. 234-238 (1992).

U. Burkhardt et al., "Aufbereiten von Polymeren mit neuartigen Eigenschaften," VDI-Verlag Dusseldorf, p. 55-78 (1995).

K. Ostoja Starzewski et al., "Linear and Branched Polyethylene by New Coordination Catalysts," *Transition Metals and Organometallics as Catalysts for Olefin Polymerization*, W. Kaminsky & H. Sinn (Editors), Springer-Verlag Berlin Heidelberg, p. 349-358 (1988).

W. Holtrup, "Zur Fraktionierung von Polymeren durch Direktextraktion," *Makromol. Chem.*, vol. 178, p. 2335-2349 (1977).

Lettau, Chemie der Heterocyclen, 1$^{st}$ Edition, VEB, Weinheim, p. 17-27 (1979).

D. Beach et al., "Dual Functional Catalysis for Ethylene Polymerization to Branched Polyethylene. I. Evaluation of Catalytic Systems," *Journal of Polymer Science: Polymer Chemistry Edition*, vol. 22, p. 3027-3042 (1984).

Ullmann's Encyclopedia of Industrial Chemistry, vol. A21, 4$^{th}$ Edition, p. 502-504 (1992).

\* cited by examiner

Holder with opened measurement cell

POLYETHYLENE AND CATALYST COMPOSITION FOR ITS PREPARATION

CROSS-REFERENCE TO RELATED APPLICATIONS

This application is a divisional of application Ser. No. 11/578,753, filed Oct. 18, 2006, now U.S. Pat. No. 7,767,613, which is a national phase filing under 35 U.S.C. §371 of International Patent Application No. PCT/EP2005/051826, filed on Apr. 25, 2005, and claiming priority to German Patent Application DE 10 2004 020 524.8, filed on Apr. 26, 2004 and U.S. Provisional Patent Application 60/587,533, filed on Jul. 13, 2004. The entire contents of application Ser. No. 12/800, 998, PCT/EP2005/051826, DE 10 2004 020 524.8, and U.S. 60/587,533, each as filed, are incorporated herein by reference.

DESCRIPTION

The present invention relates to a novel polyethylene, a catalyst composition and a process for its preparation, and also to fibers, moldings, films or polymer mixtures in which this polyethylene is present.

Ever higher demands are made of the mechanical strength of moldings comprising polyethylene. In particular, products having a high stress cracking resistance, impact toughness and stiffness which are particularly suitable for the production of hollow bodies and pressure pipes, are required. The requirement of simultaneously good stress cracking resistance and stiffness is not easy to meet, since these properties run counter to one another. While the stiffness increases with increasing density of the polyethylene, the stress cracking resistance decreases with increasing density.

Stress crack formation in plastics is a physicochemical process which does not change the polymer molecules. It is caused, inter alia, by gradual yielding or untangling of the connecting molecular chains. Stress crack formation occurs less readily the higher the mean molecular weight, the broader the molecular weight distribution and the higher the degree of molecular branching, i.e. the lower the densities. It occurs less readily the longer the side chains themselves. Surface-active substances, in particular soaps, and thermal stress accelerate stress crack formation.

The properties of bimodal polyethylenes depend, firstly, on the properties of the components present. Secondly, the quality of mixing of the high molecular weight component and the low molecular weight component is of particular importance for the mechanical properties of the polyethylene. A poor mixing quality results, inter alia, in a low stress cracking resistance and adversely affects the creep behavior of pressure pipes made of polyethylene blends.

It has been found to be advantageous to use blends of a high molecular weight, low-density ethylene copolymer and a low molecular weight, high-density ethylene homopolymer, which have good stress cracking resistances, for hollow bodies and pressure pipes, as described, for example, by L. L. Böhm et al., Adv. Mater. 4, 234-238 (1992). Similar polyethylene blends are disclosed in EP-A-100 843, EP-A 533 154, EP-A 533 155, EP-A 533 156, EP-A 533 160 and U.S. Pat. No. 5,350,807.

Such bimodal polyethylene blends are often produced using reactor cascades, i.e. two or more polymerization reactors are connected in series, and the polymerization of the low molecular weight component occurs in one reactor and that of the high molecular weight component occurs in the next (cf. for example, M. Rätzsch, W. Neiβl "Bimodale Polymerwerkstoffe auf der Basis von PP and PE" in "Aufbereiten von Polymeren mit neuartigen Eigenschaften", pp. 3-25, VDI-Verlag, Düsseldorf 1995). A disadvantage of this process is that relatively large amounts of hydrogen have to be added to produce the low molecular weight component. The polymers obtained in this way therefore have a low content of vinyl end groups, especially in the low molecular weight component. In addition, it is technically complex to prevent comonomers added in one reactor or hydrogen added as regulator from getting into the next reactor.

The use of catalyst compositions comprising two or more different olefin polymerization catalysts of the Ziegler type or the metallocene type is known. For example, it is possible to use a combination of two catalysts of which one produces a polyethylene having a mean molar mass which is different from that produced by the other for preparing reactor blends having broad molecular weight distributions (WO 95/11264). The copolymers of ethylene with higher $\alpha$-olefins such as propene, 1-butene, 1-pentene, 1-hexene or 1-octene, known as LLDPE (linear low density polyethylene) which are formed using classical Ziegler-Natta catalysts based on titanium are different from an LLDPE which is prepared using a metallocene. The number of side chains formed by incorporation of the comonomer and their distribution, known as the SCBD (short chain branching distribution) is very different when using the various catalyst systems. The number and distribution of the side chains has a critical influence on the crystallization behavior of the ethylene copolymers. While the flow properties and thus the processability of these ethylene copolymers depends mainly on their molar mass and molar mass distribution, the mechanical properties are therefore particularly dependent on the short chain branching distribution. However, the short chain branching distribution also plays a role in particular processing methods, e.g. in film extrusion in which the crystallization behavior of the ethylene copolymers during cooling of the film extrudate is an important factor in determining how quickly and in what quality a film can be extruded. The correct combination of catalysts for a balanced combination of catalysts for a balanced combination of good mechanical properties and good processability is difficult to find in view of the large number of possible combinations.

The addition of metal components, including late transition metals, to olefin polymerization catalysts based on early transition metals to increase the activity or stability of the latter catalysts has been described many times (Herrmann, C.; Streck, R.; Angew. Makromol. Chem. 94 (1981) 91-104).

The synthesis of branched polymers from ethylene without use of a comonomer using bimetallic catalysts in which one catalyst oligomerizes part of the ethylene and the other copolymerizes the oligomers formed in this way with ethylene has been described (Beach, David L.; Kissin, Yury V.; J. Polym. Sci., Polym. Chem. Ed. (1984), 22, 3027-42. Ostoja-Starzewski, K. A.; Witte, J.; Reichert, K. H., Vasiliou, G. in Transition Metals and Organometallics as Catalysts for Olefin Polymerization. Kaminsky, W.; Sinn, H. (editors); Springer-Verlag; Heidelberg; 1988; pp. 349-360). The latter reference describes, for example, the use of a nickel-containing oligomerization catalyst in combination with a chromium-containing polymerization catalyst.

WO 99/46302 describes a catalyst composition based on (a) an iron-pyridinebisimine component and (b) a further catalyst such as a zirconocene or Ziegler catalyst and their use for the polymerization of ethylene and olefins.

The known ethylene copolymer blends still leave something to be desired in terms of the combination of good mechanical properties and good processability and often have too few vinyl end groups to be suitable, for example, for applications such as crosslinked pipes.

It was an object of the present invention to provide a suitable polyethylene having good mechanical properties, good processability and a high proportion of vinyl groups.

It has surprisingly been found that this object can be achieved using a specific catalyst composition by means of which a polyethylene having good mechanical properties, good processability and a high proportion of vinyl groups can be prepared.

We have accordingly found a polyethylene which comprises ethylene homopolymers and copolymers of ethylene with α-olefins and has a molar mass distribution width $M_w/M_n$ of from 6 to 100, a density of from 0.89 to 0.97 g/cm$^3$, a weight average molar mass $M_w$ of from 5000 g/mol to 700 000 g/mol and has from 0.01 to 20 branches/1000 carbon atoms and at least 0.5 vinyl groups/1000 carbon atoms, wherein the 5-50% by weight of the polyethylene having the lowest molar masses have a degree of branching of less than 10 branches/1000 carbon atoms and the 5-50% by weight of the polyethylene having the highest molar masses have a degree of branching of more than 2 branches/1000 carbon atoms.

We have also found polymer blends in which at least one polyethylene according to the invention is present, and also fibers, films and moldings in which the polyethylene of the invention is present as a significant component.

Furthermore, we have found the use of the polyethylenes of the invention for producing fibers, films and moldings.

We have also found a catalyst system for preparing the polyethylenes of the invention, the use of the catalyst system for the polymerization of ethylene or copolymerization of ethylene with olefins and a process for preparing the polyethylene of the invention by polymerization of ethylene or copolymerization of ethylene with olefins in the presence of the catalyst system.

The polyethylene of the invention has a molar mass distribution width $M_w/M_n$ in the range from 6 to 100, preferably from 11 to 60 and particularly preferably from 20 to 40. The density of the polyethylene of the invention is in the range from 0.89 to 0.97 g/cm$^3$, preferably from 0.92 to 0.965 g/cm$^3$ and particularly preferably in the range from 0.941 to 0.96 g/cm$^3$. The weight average molar mass $M_w$ of the polyethylene of the invention is in the range from 5000 g/mol to 700 000 g/mol, preferably from 30 000 g/mol to 550 000 g/mol and particularly preferably from 70 000 g/mol to 450 000 g/mol.

The molar mass distribution of the polyethylene of the invention can be monomodal, bimodal or multimodal. In the present patent application, a monomodal molar mass distribution means that the molar mass distribution has a single maximum. A bimodal molar mass distribution means, for the purposes of the present patent application, that the molar mass distribution has at least two points of inflection on one flank starting from a maximum. The molar mass distribution is preferably monomodal or bimodal, in particular bimodal.

The polyethylene of the invention has from 0.01 to 20 branches/1000 carbon atoms, preferably from 1 to 15 branches/1000 carbon atoms and particularly preferably from 3 to 10 branches/1000 carbon atoms. The branches/1000 carbon atoms are determined by means of $^{13}$C-NMR, as described by James. C. Randall, JMS-REV. Macromol. Chem. Phys., C29 (2&3), 201-317 (1989), and refer to the total content of CH$_3$ groups/1000 carbon atoms.

The polyethylene of the invention has at least 0.2 vinyl groups/1000 carbon atoms, preferably from 0.7 to 5 vinyl groups/1000 carbon atoms and particularly preferably from 0.9 to 3 vinyl groups/1000 carbon atoms. The content of vinyl groups/1000 carbon atoms is determined by means of IR, ASTM D 6248-98. For the present purposes, the expression vinyl groups refers to —CH=CH$_2$ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion. Vinylidene and vinyl groups can subsequently be functionalized or crosslinked, with vinyl groups usually being more suitable for these subsequent reactions. The polyethylene of the invention is therefore particularly useful in applications which require subsequent functionalization or crosslinking, for example pipes or for producing adhesives.

Preference is given to at least 0.2 vinyl groups/1000 carbon atoms, preferably from 0.5 to 10 vinyl groups/1000 carbon atoms and particularly preferably from 0.7 to 5 vinyl groups/1000 carbon atoms being present in the 20% by weight of the polyethylene having the lowest molar masses. This can be determined by Holtrup fractionation as described in W. Holtrup, Makromol. Chem. 178, 2335 (1977) coupled with IR measurement of the different fractions, with the vinyl groups being measured in accordance with ASTM D 6248-98. Xylene and ethylene glycol diethyl ether at 130° C. were used as solvents for the fractionation. 5 g of polyethylene were used and were divided into 8 fractions.

The polyethylene of the invention preferably has at least 0.05 vinylidene groups/1000 carbon atoms, in particular from 0.1 to 1 vinylidene groups/1000 carbon atoms and particularly preferably from 0.15 to 0.5 vinyl groups/1000 carbon atoms. The determination is carried out in accordance with ASTM D 6248-98.

The 5-50% by weight of the polyethylene of the invention having the lowest molar masses, preferably 10-40% by weight and particularly preferably 15-30% by weight, have a degree of branching of less than 10 branches/1000 carbon atoms. This degree of branching in the part of the polyethylene having the lowest molar masses is preferably from 0.01 to 5 branches/1000 carbon atoms and particularly preferably from 0.1 to 2 branches/1000 carbon atoms. The 5-50% by weight of the polyethylene of the invention having the highest molar masses, preferably 10-40% by weight and particularly preferably 15-30% by weight, have a degree of branching of more than 2 branches/1000 carbon atoms. This degree of branching in the part of the polyethylene having the highest molar masses is preferably from 2 to 40 branches/1000 carbon atoms and particularly preferably from 5 to 20 branches/1000 carbon atoms. The part of the polyethylene having the lowest or highest molar mass is determined by the method of Holtrup as described in W. Holtrup, Makromol. Chem. 178, 2335 (1977) and the fractions are subsequently examined by $^{13}$C-NMR spectroscopy. The degree of branching in the various polymer fractions can be determined by means of $^{13}$C-NMR as described by James. C. Randall, JMS-REV. Macromol. Chem. Phys., C29 (2&3), 201-317 (1989). The degree of branching is the total CH$_3$ content/1000 carbon atoms in the low or high molecular weight fractions.

The polyethylene of the invention preferably has from 0.01 to 20 branches of side chains larger than CH$_3$/1000 carbon atoms, preferably side chains from C$_2$-C$_6$/1000 carbon atoms, preferably from 1 to 15 branches of side chains larger than CH$_3$/1000 carbon atoms, preferably side chains from C$_2$-C$_6$/1000 carbon atoms and particularly preferably from 2 to 8 branches of side chains larger than CH$_3$/1000 carbon atoms, preferably side chains from C$_2$-C$_6$/1000 carbon atoms. The branches of side chains larger than CH$_3$/1000 carbon atoms are determined by means of $^{13}$C-NMR, as determined by James. C. Randall, JMS-REV. Macromol. Chem. Phys., C29 (2&3), 201-317 (1989), and refer to the total content of side chains larger than CH$_3$ groups/1000 carbon atoms (without end groups). It is particularly preferred in polyethylene with 1-butene, 1-hexene or 1-octene as the α-olefin to have 0.01 to 20 ethyl, butyl or hexyl side branches/1000 carbon atoms, preferably from 1 to 15 ethyl, butyl or hexyl side branches/1000 carbon atoms and particularly preferably from 2 to 8 ethyl, butyl or hexyl side branches/1000 carbon atoms. This refers to the content of ethyl, butyl or hexyl side chains/1000 carbon atoms without the end groups.

In the polyethylene of the invention, the part of the polyethylene having a molar mass of less than 10 000 g/mol, preferably less than 20 000, preferably has a degree of branching of from 0 to 1.5 branches of side chains larger than CH$_3$/1000 carbon atoms, preferably side chains from C$_2$-C$_6$/1000 carbon atoms. Particular preference is given to the part of the polyethylene having a molar mass of less than 10 000 g/mol, preferably less than 20 000, having a degree of branching of from 0.1 to 0.9 branches of side chains larger than CH$_3$/1000 carbon atoms, preferably side chains from C$_2$-C$_6$/1000 carbon atoms. Preferably the polyethylene of the invention with 1-butene, 1-hexene or 1-octene as the α-olefin, the part of the polyethylene having a molar mass of less than 10 000 g/mol, preferably less than 20 000, preferably has a degree of from 0 to 1.5 ethyl, butyl or hexyl branches of side chains/1000 carbon atoms. Particular preference is given to the part of the polyethylene having a molar mass of less than 10 000 g/mol, preferably less than 20 000, having a degree of branching of from 0.1 to 0.9 ethyl, butyl or hexyl branches of side chains/1000 carbon atoms. This too, can be determined by means of the Holtrup/$^{13}$C-NMR method described.

Furthermore, it is preferred that at least 70% of the branches of side chains larger than CH$_3$ in the polyethylene of the invention are present in the 50% by weight of the polyethylene having the highest molar masses. This too can be determined by means of the Holtrup/$^{13}$C-NMR method described.

The molar mass distribution of the polyethylene of the invention can formally be calculated as an overlap of two monomodal molar mass distributions. The maxima of the molar mass of the low molecular weight component are preferably in the range from 3000 to 50 000 g/mol, in particular from 5000 to 30 000 g/mol. The maxima of the molar mass of the high molecular weight component are preferably in the range from 40 000 to 500 000 g/mol, in particular from 50 000 to 200 000 g/mol. The difference between the individual peaks of the molar mass distribution of the polyethylene of the invention is preferably in the range from 30 000 to 400 000 g/mol, particularly preferably from 50 000 to 200 000 g/mol.

The HLMI of the polyethylene of the invention is preferably in the range from 0 to 200 g/10 min, preferably from 5 to 50 g/10 min. For the purposes of this invention, the expression "HLMI" refers as known to the "high load melt index" and is determined at 190° C. under a load of 21.6 kg (190° C./21.6 kg) in accordance with ISO 1133.

The polyethylene of the invention preferably has a mixing quality measured in accordance with ISO 13949 of less than 3, in particular from 0 to 2.5. This value is based on the polyethylene taken directly from the reactor, i.e. the polyethylene powder without prior melting in an extruder. This polyethylene powder is preferably obtainable by polymerization in a single reactor.

The polyethylene of the invention preferably has a degree of long chain branching λ (lambda) of from 0 to 2 long chain branches/10 000 carbon atoms and particularly preferably from 0.1 to 1.5 long chain branches/10 000 carbon atoms. The degree of long chain branching λ (lambda) was measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

The polyethylene of the invention preferably has a CDBI of less than 50%, in particular from 10 to 45%. The method of determining the CDBI is described, for example in WO 93/03093. The TREF method is described, for example, in Wild, Advances in Polymer Science, 98, p. 1-47, 57 p. 153, 1992. The CDBI is defined as the percentage by weight of the copolymer molecules having a comonomer content of ±25% of the mean total molar comonomer content.

The stress cracking resistance of the polyethylene of the invention is preferably at least 50 h, more preferably at least 160 h. The stress cracking resistance is measured at 50° C. on round, disk-shaped test specimens (diameter: 38 mm, thickness (height): 1 mm, scored on one side with a notch having a length of 20 mm and a depth of 0.2 mm) which are dipped into a 5% Lutensol solution and loaded with a pressure of 3 bar. The time to occurrence of stress cracks is measured (reported in h).

As α-olefins, which are the comonomers which can be present, either individually or in a mixture with one another, in addition to ethylene in the ethylene copolymer part of the polyethylene of the invention, it is possible to use all α-olefins having from 3 to 12 carbon atoms, e.g. propene, 1-butene, 1-pentene, 1-hexene, 4-methyl-1-pentene, 1-heptene, 1-octene and 1-decene. The ethylene copolymer preferably comprises α-olefins having from 4 to 8 carbon atoms, e.g. 1-butene, 1-pentene, 1-hexene, 4-methylpentene or 1-octene, in copolymerized form as comonomer unit. Particular preference is given to using α-olefins selected from the group consisting of 1-butene, 1-hexene and 1-octene.

The polyethylene of the invention can also be a constituent of a polymer blend. Thus, for example, two or three different ethylene copolymers which may differ, for example, in their density and/or molar mass distribution and/or short chain branching distribution can be mixed with one another.

Further suitable polymer blends comprise
(P1) from 20 to 99% by weight of one or more of the polyethylenes according to the invention and
(P2) from 1 to 80% by weight of a polymer which is different from (P1), with the percentages by weight being based on the total mass of the polymer blend.

Particularly useful polymer blends are ones comprising
(E) from 30 to 95% by weight of one of the polyethylenes according to the invention, particularly preferably from 50 to 85% by weight, and
(F) from 5 to 70% by weight of a polyolefin which is different from (P1), particularly preferably from 15 to 50% by weight, where the percentages by weight are based on the total mass of the polymer blend.

The type of further polymer components (P2) in the blend depends on the future use of the blend. The blend can be obtained, for example, by blending one or more additional LLDPEs or HDPEs or LDPEs or PPs or polyamides or polyesters. The polymer blend can also be obtained by simultaneous polymerization using a further catalyst system which is likewise active in the polymerization of olefins. Catalysts suitable for the preparation of the polymers for blending or for carrying out simultaneous polymerization are, in particular, classical Ziegler-Natta catalysts based on titanium, classical Phillips catalysts based on chromium oxides, metallocenes, viz., in particular, metal complexes of groups 3 to 6 of the Periodic Table of the Elements containing one, two or three cyclopentadienyl, indenyl and/or fluorenyl systems, constrained geometry complexes (cf., for example, EP A 0 416 815 or EP A 0 420 436), nickel and palladium bisimine systems (for the preparation of these, see WO 9803559 A1) or iron and cobalt pyridinebisimine compounds (for the preparation of these, see WO 9827124 A1). The further polymerization catalysts can likewise be supported on one the same support or different supports.

The blends comprising the polyethylenes of the invention can further comprise two or three other olefin polymers or copolymers. These can be, for example, LDPEs (blends thereof are described, for example, DE-A1-19745047) or polyethylene homopolymers (blends thereof are described, for example, in EP-B-100843) or LLDPEs (as described, for example, in EP-B-728160 or WO-A-90/03414) or LLDPE/LDPE mixtures (WO 95/27005 or EP-B1-662989).

The ethylene copolymers, polymer mixtures and blends can further comprise auxiliaries and/or additives known per se, e.g. processing stabilizers, stabilizers against the effects of light and heat, customary additives such as lubricants, antioxidants, antiblocking agents and antistatics, and also, if appropriate, dyes. A person skilled in the art will be familiar with the type and amount of these additives.

Furthermore, it has been found that the processing properties of the polyethylenes of the invention can be improved further by incorporation of small amounts of fluoroelastomers or thermoplastic polyesters. Such fluoroelastomers are known as such as processing aids and are commercially available, for example, under the trade names Viton® and Dynamar® (cf. also, for example, U.S. Pat. No. 3,125,547). They are preferably added in amounts of from 10 to 1000 ppm, particularly preferably from 20 to 200 ppm, based on the total mass of the polymer blend according to the invention.

The polyethylenes of the invention can also be modified subsequently by grafting, crosslinking, hydrogenation, functionalization or other functionalization reactions known to those skilled in the art.

The preparation of the polymer blends by mixing can be carried out by all known methods. It can be done, for example, by introducing the powder components into a granulation apparatus, e.g. a twin-screw kneader (ZSK), Farrel kneader or Kobe kneader. The granulated mixture can also be processed directly on a film production plant.

The polyethylenes and polymer blends of the invention are, for example, very suitable for producing films on blown film and cast film plants at high outputs. The films made of the polymer blends display very good mechanical properties, high shock resistance and high ultimate tensile strength together with very good optical properties, in particular transparency and gloss. They are suitable, in particular, for the packing sector, for example as heat sealing films, both for heavy duty sacks and also for the food sector. Furthermore, the films display only a low blocking tendency and can therefore be handled by machine with only small additions, if any, of lubricants and antiblocking agents.

Owing to their good mechanical properties, the polyethylenes of the invention are likewise suitable for producing fibers and moldings, in particular for pipes and crosslinkable pipes. They are likewise suitable for blow molding, rotomolding or injection molding. They are also suitable as compounding components, bonding agents and as rubber components in polypropylene, in particular in polypropylene compounds having high impact toughnesses.

Fibers, films and moldings in which the polyethylene of the invention is present as a significant component are ones which contain from 50 to 100% by weight, preferably from 60 to 90% by weight, of the polyethylene of the invention, based on the total polymer material used for manufacture. In particular, films and moldings in which one of the layers contains from 50 to 100% by weight of the polyethylene of the invention are also included.

Preference is given to fibers comprising a polyethylene according to the invention in the density range from 0.94 to 0.96 g/cm$^3$. These fibers preferably have an MI$_5$ of 0.5-5 g/10 cm. Preference is given to films comprising a polyethylene according to the invention in the density range from 0.91 to 0.95 g/cm$^3$ and in particular from 0.92 to 0.94 g/cm$^3$. These films preferably have an MI$_5$ of 0-10 g/10 cm. Preference is given to moldings comprising a polyethylene according to the invention in the density range from 0.93 to 0.965 g/cm$^3$. These moldings preferably have an MI$_5$ of 0-5 g/10 cm. Among these moldings, particular preference is given to pipes, large hollow bodies having a volume of more than 10 l and bottles. Particular preference is given to pipes comprising the polyethylene according to the invention in a density range from 0.93 to 0.955 g/cm$^3$. These pipes preferably have an MI$_5$ of 0-1 g/10 cm. Particular preference is given to large hollow bodies comprising the polyethylene according to the invention in a density range from 0.94 to 0.955 g/cm$^3$. These large hollow bodies preferably have an MI$_5$ of 0-1 g/10 cm. Particular preference is given to bottles comprising the polyethylene according to the invention in a density range from 0.945 to 0.955 g/cm$^3$. These bottles preferably have an MI$_5$ of 0.5-5 g/10 cm. Preference is also given to injection-molded products comprising a polyethylene according to the invention in the density range from 0.95 to 0.965 g/cm$^3$. These products preferably have an MI$_5$ of 2-60 g/10 cm.

The polyethylene of the invention is obtainable using the catalyst system of the invention and in particular its preferred embodiments.

The present invention further provides a catalyst composition comprising at least two different polymerization catalysts of which A) is at least one polymerization catalyst based on a monocyclopentadienyl complex of a metal of groups 4-6 of the Periodic Table of the Elements whose cyclopentadienyl system is substituted by an uncharged donor (A1) or a hafnocene (A2) and B) is at least one polymerization catalyst based on an iron component having a tridentate ligand bearing at least two ortho, ortho-disubstituted aryl radicals (B).

The invention further provides a process for the polymerization of olefins in the presence of the catalyst composition of the invention.

For the purposes of the present invention, an uncharged donor is an uncharged functional group containing an element of group 15 or 16 of the Periodic Table.

Hafnocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Preference is given to monocyclopentadienyl complexes (A1) containing the following structural feature of the general formula Cp-Y$_m$M$^A$ (I), where the variables have the following meanings:

Cp is a cyclopentadienyl system,

Y is a substituent which is bound to Cp and contains at least one uncharged donor containing at least one atom of group 15 or 16 of the Periodic Table, M$^A$ is titanium, zirconium, hafnium, vanadium, niobium, tantalum, chromium, molybdenum or tungsten, in particular chromium, and m is 1, 2 or 3.

Suitable monocyclopentadienyl complexes (A1) contain the structural element of the general formula Cp-Y$_m$M$^A$ (I), where the variables are as defined above. Further ligands can therefore be bound to the metal atom M$^A$. The number of further ligands depends, for example, on the oxidation state of the metal atom. These ligands are not further cyclopentadienyl systems. Suitable ligands include monoanionic and dianionic ligands as have been described, for example, for X. In addition, Lewis bases such as amines, ethers, ketones, aldehydes, esters, sulfides or phosphines can also be bound to the metal center M. The monocyclopentadienyl complexes can be in monomeric, dimeric or oligomeric form. The monocyclopentadienyl complexes are preferably in monomeric form.

M$^A$ is a metal selected from the group consisting of titanium, zirconium, hafnium, vanadium, niobium, tantalum, chromium, molybdenum and tungsten. The oxidation state of the transition metals M$^A$ in catalytically active complexes is usually known to those skilled in the art. Chromium, molybdenum and tungsten are very probably present in the oxidation state +3, zirconium and hafnium in the oxidation state +4 and titanium in the oxidation state +3 or +4. However, it is also possible to use complexes whose oxidation state does not correspond to that of the active catalyst. Such complexes can then be appropriately reduced or oxidized by means of suitable activators. M$^A$ is preferably titanium in the oxidation state 3, vanadium, chromium, molybdenum or tungsten. Particular preference is given to chromium in the oxidation states 2, 3 and 4, in particular 3.

m can be 1, 2 or 3, i.e. 1, 2 or 3 donor groups Y may be bound to Cp, with these being able to be identical or different when 2 or 3 groups Y are present. Preference is given to only one donor group Y being bound to Cp (m=1).

The uncharged donor Y is an uncharged functional group containing an element of group 15 or 16 of the Periodic Table, e.g. an amine, imine, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems. The donor Y can be bound intermolecularly or intramolecularly to the transition metal M$^A$ or not be bound to it. The donor Y is preferably bound intramolecularly to the metal center M$^A$. Particular preference is given to monocyclopentadienyl complexes containing the structural element of the general formula Cp-Y-M$^A$.

Cp is a cyclopentadienyl system which may be substituted in any way and/or be fused with one or more aromatic, aliphatic, heterocyclic or heteroaromatic rings, with 1, 2 or 3 substituents, preferably 1 substituent, being formed by the group Y and/or 1, 2 or 3 substituents, preferably 1 substituent being substituted by the group Y and/or the aromatic, aliphatic, heterocyclic or heteroaromatic fused-on ring bearing 1, 2 or 3 substituents, preferably 1 substituent. The cyclopentadienyl skeleton itself is a C$_5$ ring system having 6 it electrons, in which one of the carbon atoms may also be replaced by nitrogen or phosphorus, preferably phosphorus. Preference is given to using C$_5$ ring systems without replacement by a heteroatom. This cyclopentadienyl skeleton can be, for example, fused with a heteroaromatic containing at least one atom from the group consisting of N, P, O and S or with an aromatic. In this context, fused means that the heterocycle and the cyclopentadienyl skeleton share two atoms, preferably carbon atoms. The cyclopentadienyl system is bound to M$^A$.

Particularly well-suited monocyclopentadienyl complexes (A1) are ones in which Y is formed by the group —Z$_k$-A- and together with the cyclopentadienyl system Cp and M$^A$ forms a monocyclopentadienyl complex containing the structural element of the general formula Cp-Z$_k$-A-M$^A$ (II), where the variables have the following meanings:

Cp-Z$_k$-A is

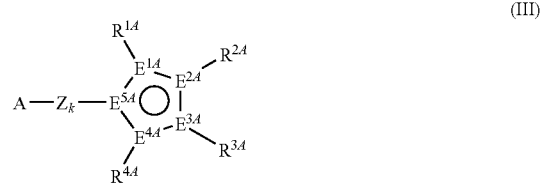

(III)

where the variables have the following meanings:

E$^{1A}$-E$^{5A}$ are each carbon or not more than one E$^{1A}$ to E$^{5A}$ phosphorus, R$^{1A}$-R$^{4A}$ are each, independently of one another, hydrogen, C$_1$-C$_{22}$-alkyl, C$_2$-C$_{22}$-alkenyl, C$_6$-C$_{22}$-aryl, alkylaryl having from 1 to 10 carbon atoms in the alkyl radical and 6-20 carbon atoms in the aryl radical, NR$^{5A}$$_2$, N(SiR$^{5A}$$_3$)$_2$, OR$^{5A}$, OSiR$^{5A}$$_3$, SiR$^{5A}$$_3$, BR$^{5A}$$_2$, where the organic radicals R$^{1A}$-R$^{4A}$ may also be substituted by halogens and two vicinal radicals R$^{1A}$-R$^{4A}$ may also be joined to form a five-, six- or seven-membered ring, and/or two vicinal radicals R$^{1A}$-R$^{4A}$ are joined to form a five-, six- or seven-membered heterocycle containing at least one atom from the group consisting of N, P, O and S, the radicals R$^{5A}$ are each, independently of one another, hydrogen, C$_1$-C$_{20}$-alkyl, C$_2$-C$_{20}$-alkenyl, C$_6$-C$_{20}$-aryl, alkylaryl having from 1 to 10 carbon atoms in the alkyl part and 6-20 carbon atoms in the aryl part and two geminal radicals R$^{5A}$ may also be joined to form a five- or six-membered ring, Z is a divalent bridge between A and Cp which is selected from the following group

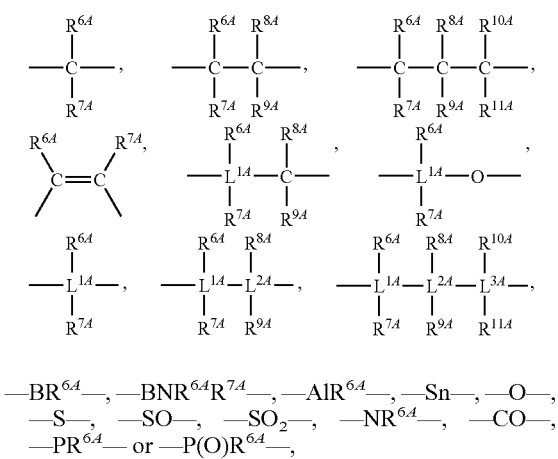

—BR$^{6A}$—, —BNR$^{6A}$R$^{7A}$—, —AlR$^{6A}$—, —Sn—, —O—, —S—, —SO—, —SO$_2$—, —NR$^{6A}$—, —CO—, —PR$^{6A}$— or —P(O)R$^{6A}$—, where $L^{1A}$-$L^{3A}$ are each, independently of one another, silicon or germanium, $R^{6A}$-$R^{11A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{12A}{}_3$, where the organic radicals $R^{6A}$-$R^{11A}$ may also be substituted by halogens and two geminal or vicinal radicals $R^{6A}$-$R^{11A}$ may also be joined to form a five- or six-membered ring and the radicals $R^{12A}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl part and 6-20 carbon atoms in the aryl part, $C_1$-$C_{10}$-alkoxy or $C_6$-$C_{10}$-aryloxy and two radicals $R^{12A}$ may also be joined to form a five- or six-membered ring, and A is an uncharged donor group containing one or more atoms of group 15 and/or 16 of the Periodic Table of the Elements, preferably an unsubstituted, substituted or fused, heteroaromatic ring system, $M^A$ is a metal selected from the group consisting of titanium in the oxidation state 3, vanadium, chromium, molybdenum and tungsten, in particular chromium, and k is 0 or 1.

In preferred cyclopentadienyl systems Cp, all $E^{1A}$ to $E^{5A}$ are carbon.

The polymerization behavior of the metal complexes can be influenced by varying the substituents $R^{1A}$-$R^{4A}$. The number and type of substituents can influence the accessibility of the metal atom M for the olefins to be polymerized. In this way, it is possible to modify the activity and selectivity of the catalyst in respect of various monomers, in particular bulky monomers. Since the substituents can also influence the rate of termination reactions of the growing polymer chain, the molecular weight of the polymers formed can also be altered in this way. The chemical structure of the substituents $R^{1A}$ to $R^{4A}$ can therefore be varied within a wide range in order to achieve the desired results and to obtain a tailored catalyst system. Possible carboorganic substituents $R^{1A}$-$R^{4A}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1A}$ to $R^{4A}$ may also be joined to form a 5-, 6- or 7-membered ring and/or two vicinal radicals $R^{1A}$-$R^{4A}$ may be joined to form a five-, six- or seven-membered heterocycle containing at least one atom from the group consisting of N, P, O and S and/or the organic radicals $R^{1A}$-$R^{4A}$ may also be substituted by halogens such as fluorine, chlorine or bromine. Furthermore, $R^{1A}$-$R^{4A}$ may be amino $NR^{5A}{}_2$ or $N(SiR^{5A}{}_3)_2$, alkoxy or aryloxy $OR^{5A}$, for example dimethylamino, N-pyrrolidinyl, picolinyl, methoxy, ethoxy or isopropoxy. The radicals $R^{5A}$ in organosilicone substituents $SiR^{5A}{}_3$ can be the same carboorganic radicals as described above for $R^{1A}$-$R^{4A}$, where two radicals $R^{5A}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{5A}{}_3$ radicals may also be joined to the cyclopentadienyl skeleton via an oxygen or nitrogen, for example trimethylsilyloxy, triethylsilyloxy, butyldimethylsilyloxy, tributylsilyloxy or tritert-butylsilyloxy. Preferred radicals are hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Possible organosilicon substituents are, in particular, trialkylsilyl groups having from 1 to 10 carbon atoms in the alkyl radical, in particular trimethylsilyl groups.

Two vicinal radicals $R^{1A}$-$R^{4A}$ together with the $E^{1A}$-$E^{5A}$ bearing them may form a heterocycle, preferably heteroaromatic, containing at least one atom from the group consisting of nitrogen, phosphorus, oxygen and sulfur, particularly preferably nitrogen and/or sulfur, with the $E^{1A}$-$E^{5A}$ present in the heterocycle or heteroaromatic preferably being carbons. Preference is given to heterocycles and heteroaromatics having a ring size of 5 or 6 ring atoms. Examples of 5-membered heterocycles which may contain from one to four nitrogen atoms and/or a sulfur or oxygen atom as ring atoms in addition to carbon atoms are 1,2-dihydrofuran, furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. Examples of 6-membered heteroaryl groups which may contain from one to four nitrogen atoms and/or a phosphorus atom are pyridine, phosphabenzene, pyridazine, pyrimidine, pyrazine, 1,3,5-triazine 1,2,4-triazine or 1,2,3-triazine. The 5-membered and 6-membered heterocycles may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine, dialkylamide, alkylarylamide, diarylamide, alkoxy or aryloxy or be fused with one or more aromatics or heteroaromatics. Examples of benzo-fused 5-membered heteroaryl groups are indole, indazole, benzofuran, benzothiophene, benzothiazole, benzoxazole and benzimidazole. Examples of benzo-fused 6-membered heteroaryl groups are chroman, benzopyran, quinoline, isoquinoline, cinnoline, phthalazine, quinazoline, quinoxaline, 1,10-phenanthroline and quinolizine. Naming and numbering of the heterocycles has been taken from Lettau, Chemie der Heterocyclen, 1st edition, VEB, Weinheim 1979. The heterocycles/heteroaromatics are preferably fused with the cyclopentadienyl skeleton via a C—C double bond of the heterocycle/heteroaromatic. Heterocycles/heteroaromatics having one heteroatom are preferably 2,3- or b-fused.

Cyclopentadienyl systems Cp having a fused-on heterocycle are, for example, thiapentalene, 2-methylthiapentalene, 2-ethylthiapentalene, 2-isopropylthiapentalene, 2-n-butylthiapentalene, 2-tert-butylthiapentalene, 2-trimethylsilylthiapentalene, 2-phenylthiapentalene, 2-naphthylthiapentalene, 3-methylthiopentalene, 4-phenyl-2,6-dimethyl-1-thiopentalene, 4-phenyl-2,6-diethyl-1-thiopentalene, 4-phenyl-2,6-diisopropyl-1-thiopentalene, 4-phenyl-2,6-di-n-butyl-1-thiopentalene, 4-phenyl-2,6-ditrimethylsilyl-1-thiopentalene, azapentalene, 2-methylazapentalene, 2-ethylazapentalene, 2-isopropylazapentalene, 2-n-butylazapentalene, 2-trimethylsilylazapentalene, 2-phenylazapentalene, 2-naphthylazapentalene, 1-phenyl-2,5-dimethyl-1-azapentalene, 1-phenyl-2,5-diethyl-1-azapentalene, 1-phenyl-2,5-di-n-butyl-1- azapentalene, 1-phenyl-2,5-di-tert-butyl-1-azapentalene, 1-phenyl-2,5-di-trimethylsilyl-1-azapentalene, 1-tert-butyl-2,5-dimethyl-1-azapentalene, oxapentalene, phosphapentalene, 1-phenyl-2,5-dimethyl-1-phosphapentalene, 1-phenyl-2,5-diethyl-1-phosphapentalene, 1-phenyl-2,5-di-n-butyl-1-phosphapentalene, 1-phenyl-2,5-di-tert-butyl-1-phosphapentalene, 1-phenyl-2,5-di-trimethylsilyl-1-phosphapentalene, 1-methyl-2,5-dimethyl-1-phosphapentalene, 1-tert-butyl-2,5-dimethyl-1-phosphapentalene, 7-cyclopenta-[1,2]thiophene[3,4]cyclopentadiene or 7-cyclopenta[1,2]pyrrol[3,4]cyclopentadiene.

In further preferred cyclopentadienyl systems Cp, the four radicals $R^{1A}$-$R^{4A}$, i.e. the two pairs of vicinal radicals, form two heterocycles, in particular heteroaromatics. The heterocyclic systems are the same as those described above.

Cyclopentadienyl systems Cp having two fused heterocycles are, for example, 7-cyclopentadithiophene, 7-cyclopentadipyrrole or 7-cyclopentadiphosphole.

The synthesis of such cyclopentadienyl systems having a fused-on heterocycle is described, for example, in the above-mentioned WO 98/22486. In "metalorganic catalysts for synthesis and polymerisation", Springer Verlag 1999, Ewen et al., p. 150 ff describe further syntheses of these cyclopentadienyl systems.

Particularly preferred substituents $R^{1A}$-$R^{4A}$ are the carboorganic substituents described above and the carboorganic substituents which form a cyclic fused ring system, i.e. together with the $E^{1A}$-$E^{5A}$-cyclopentadienyl skeleton, preferably a $C_5$-cyclopentadienyl skeleton, form, for example, an unsubstituted or substituted indenyl, benzindenyl, phenanthrenyl, fluorenyl or tetrahydroindenyl system, and also, in particular, their preferred embodiments.

Examples of such cyclopentadienyl systems (without the group —Z-A-, which is preferably located in the 1 position) are 3-methylcyclopentadienyl, 3-ethylcyclopentadienyl, 3-isopropylcyclopentadienyl, 3-tert-butylcyclopentadienyl, dialkylalkylcyclopentadienyl such as tetrahydroindenyl, 2,4-dimethylcyclopentadienyl or 3-methyl-5-tert-butylcyclopentadienyl, trialkylcyclopentadienyl such as 2,3,5-trimethylcyclopentadienyl or tetraalkylcyclopentadienyl such as 2,3,4,5-tetramethylcyclopentadienyl, and also indenyl, 2-methylindenyl, 2-ethylindenyl, 2-isopropylindenyl, 3-methylindenyl, benzindenyl and 2-methylbenzindenyl. The fused ring system may bear further $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $NR^{5A}{}_2$, $N(SiR^{5A}{}_3)_2$, $OR^{5A}$, $OSiR^{5A}{}_3$ or $SiR^{5A}{}_3$, e.g. 4-methylindenyl, 4-ethylindenyl, 4-isopropylindenyl, 5-methylindenyl, 4-phenylindenyl, 5-methyl-4-phenylindenyl, 2-methyl-4-phenylindenyl or 4-naphthylindenyl.

In a particularly preferred embodiment, one of the substituents $R^{1A}$-$R^{4A}$, preferably $R^{2A}$, is a $C_6$-$C_{22}$-aryl or an alkylaryl having from 1 to 10 carbon atoms in the alkyl part and 6-20 carbon atoms in the aryl part, preferably $C_6$-$C_{22}$-aryl such as phenyl, naphthyl, biphenyl, anthracenyl or phenanthrenyl, where the aryl may also be substituted by N-, P-, O- or S-containing substituents, $C_1$-$C_{22}$-alkyl, $C_2$-$C_{22}$-alkenyl, halogens or haloalkyls or haloaryls having 1-10 carbon atoms, for example o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, o-, m-, p-dimethylaminophenyl, o-, m-, p-methoxyphenyl, o-, m-, p-fluorophenyl, o-, m-, p-chlorophenyl, o-, m-, p-trifluoromethylphenyl, 2,3-, 2,4-, 2,5- or 2,6-difluorophenyl, 2,3-, 2,4-, 2,5- or 2,6-dichlorophenyl or 2,3-, 2,4-, 2,5- or 2,6-di(trifluoromethyl)phenyl. The N-, P-, O- or S-containing substituents, $C_1$-$C_{22}$-alkyl, $C_2$-$C_{22}$-alkenyl, halogens or haloalkyls or haloaryls having 1-10 carbon atoms as substituents on the aryl radical are preferably located in the para position relative to the bond to the cyclopentadienyl ring. The aryl substituent can be bound in the vicinal position relative to the substituent —Z-A or the two substituents are located relative to one another in the 1,3 positions on the cyclopentadienyl ring. —Z-A and the aryl substituent are preferably present in the 1,3 positions relative to one another on the cyclopentadienyl ring.

As in the case of the metallocenes, the monocyclopentadienyl complexes (A1) can be chiral. Thus, one of the substituents $R^{1A}$-$R^{4A}$ of the cyclopentadienyl skeleton can have one or more chiral centers or the cyclopentadienyl system Cp itself can be enantiotopic so that chirality is induced only when it is bound to the transition metal M (for the formalism regarding chirality in cyclopentadienyl compounds, see R. Halterman, Chem. Rev. 92, (1992), 965-994).

The bridge Z between the cyclopentadienyl system Cp and the uncharged donor A is a divalent organic bridge (k=1) which preferably consists of carbon- and/or silicon- and/or boron-containing bridge members. The activity of the catalyst can be influenced by changing the length of the linkage between the cyclopentadienyl system and A. Z is preferably bound to the cyclopentadienyl skeleton next to the fused-on heterocycle or fused-on aromatic. Thus, if the heterocycle or aromatic is fused on in the 2,3 positions of the cyclopentadienyl skeleton, then Z is preferably located in the 1 or 4 position of the cyclopentadienyl skeleton.

Possible carboorganic substituents $R^{6A}$-$R^{11A}$ on the linkage Z are, for example, the following: hydrogen, $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl, or arylalkyl which may be substituted by further alkyl groups, e.g. benzyl, o-, m-, p-methylbenzyl, 1- or 2-ethylphenyl, where two $R^{6A}$ to $R^{11A}$ may also be joined to form a 5- or 6-membered ring, for example cyclohexane, and the organic radicals $R^{6A}$-$R^{11A}$ may also be substituted by halogens such as fluorine, chlorine or bromine, for example pentafluorophenyl or bis-3,5-trifluoromethylphen-1-yl and alkyl or aryl.

The radicals $R^{12A}$ in organosilicon substitutents $SiR^{12A}{}_3$ can be the same radicals as mentioned above for $R^{6A}$-$R^{11A}$, where two radicals $R^{12A}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. Preferred radicals $R^{6A}$-$R^{11A}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl.

Particularly preferred substituents $R^{6A}$ to $R^{11A}$ are hydrogen, $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, $C_6$-$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl, or arylalkyl which may be substituted by further alkyl groups, e.g. benzyl, o-, m-, p-methylbenzyl, 1- or 2-ethylphenyl where two radicals $R^{6A}$ to $R^{11A}$ may also be joined to form a 5- or 6-membered ring, for example cyclohexane, and the organic radicals $R^{6A}$-$R^{2B}$ may also be substituted by halogens such as fluorine, chlorine or bromine, in particular fluorine, for example pentafluorophenyl or bis-3,5-trifluoromethylphen-1-yl and alkyl or aryl. Particular preference is given to methyl, ethyl, 1-propyl, 2-isopropyl, 1-butyl, 2-tert-butyl, phenyl and pentafluorophenyl.

Z is preferably a group —$CR^{6A}R^{7A}$—, —$SiR^{6A}R^{7A}$—, in particular —$Si(CH_3)_2$—, —$CR^{6A}R^{7A}CR^{8A}R^{9A}$—, —$SiR^{6A}R^{7A}CR^{8A}R^{9A}$— or substituted or unsubstituted 1,2-phenylene and in particular —$CR^{6A}R^{7A}$—. The preferred embodiments of the substituents $R^{6A}$ to $R^{11A}$ described above are likewise preferred embodiments here. Preference is given to —$CR^{6A}R^{7A}$ being a —$CHR^{6A}$—, —$CH_2$— or —$C(CH_3)_2$— group. The group —$SiR^{6A}R^{7A}$— in -$L^{1A}R^{6A}R^{7A}CR^{8A}R^{9A}$— can be bound to the cyclopentadienyl system or to A. This group —$SiR^{6A}R^{7A}$— or a preferred embodiment thereof is preferably bound to Cp.

k is 0 or 1; in particular, k is 1 or when A is an unsubstituted, substituted or fused, heterocyclic ring system may also be 0. Preference is given to k being 1.

A is an uncharged donor containing an atom of group 15 or 16 of the Periodic Table, preferably one or more atoms selected from the group consisting of oxygen, sulfur, nitrogen and phosphorus, preferably nitrogen and phosphorus. The donor function in A can bind intermolecularly or intramolecularly to the metal $M^A$. The donor in A is preferably bound intramolecularly to M. Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide or unsubstituted, substituted or fused, heterocyclic ring systems. The attachment of A to the cyclopentadienyl radical and Z can be carried out synthetically by, for example, a method analogous to that described in WO 00/35928.

A is preferably a group selected from among —$OR^{13A}$—, —$SR^{13A}$—, —$NR^{13A}R^{14A}$—, —$PR^{13A}R^{14A}$—, —$C\!=\!NR^{13A}$— and unsubstituted, substituted or fused heteroaromatic ring systems, in particular —$NR^{13A}R^{14A}$—, —$C\!=\!NR^{13A}$— and unsubstituted, substituted or fused heteroaromatic ring systems.

$R^{13A}$ and $R^{14A}$ are each, independently of one another, hydrogen, $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl, alkylaryl which has from 1 to 10 carbon atoms in the alkyl part and 6-20 carbon atoms in the aryl part and may be substituted by further alkyl groups, e.g. benzyl, o-, m-, p-methylbenzyl, 1- or 2-ethylphenyl or $SiR^{15A}_3$, where the organic radicals $R^{13A}$-$R^{14A}$ may also be substituted by halogens such as fluorine, chlorine or bromine or nitrogen-containing groups and further $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{15A}_3$ groups and two vicinal radicals $R^{13A}$-$R^{14A}$ may also be joined to form a five- or six-membered ring and the radicals $R^{15A}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl part and 6-20 carbon atoms in the aryl part and two radicals $R^{15A}$ may also be joined to form a five- or six-membered ring.

$NR^{13A}R^{14A}$ is an amide substituent. It is preferably a secondary amide such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl) amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

In the imino group —$C\!=\!NR^{13A}$, $R^{13A}$ is preferably a $C_6$-$C_{20}$-aryl radical which may be substituted by further alkyl groups, e.g. phenyl, naphthyl, biphenyl, anthranyl, o-, m-, p-methylphenyl, 2,3-, 2,4-, 2,5- or 2,6-dimethylphen-1-yl, 2,3,4-, 2,3,5-, 2,3,6-, 2,4,5-, 2,4,6- or 3,4,5-trimethylphen-1-yl.

A is preferably an unsubstituted, substituted or fused heteroaromatic ring system which can contain heteroatoms from the group consisting of oxygen, sulfur, nitrogen and phosphorus in addition to ring carbons. Examples of 5-membered heteroaryl groups which may contain from one to four nitrogen atoms or from one to three nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M.

Fieser, Lehrbuch der organischen Chemie, 3$^{rd}$ revised edition, Verlag Chemie, Weinheim 1957.

Among these heteroaromatic systems A, particular preference is given to unsubstituted, substituted and/or fused six-membered heteroaromatics having 1, 2, 3, 4 or 5 nitrogen atoms in the heteroaromatic part, in particular substituted and unsubstituted 2-pyridyl or 2-quinolyl. A is therefore preferably a group of the formula (IV)

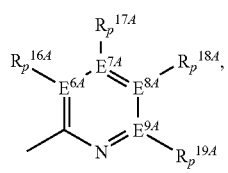

where
$E^{6A}$-$E^{9A}$ are each, independently of one another, carbon or nitrogen,
$R^{16A}$-$R^{19A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{20A}_3$, where the organic radicals $R^{16A}$-$R^{19A}$ may also be substituted by halogens or nitrogen and further $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{20A}_3$ and two vicinal radicals $R^{16A}$-$R^{19A}$ or $R^{16A}$ and Z may also be joined to form a five- or six-membered ring and the radicals $R^{20A}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl radical and 6-20 carbon atoms in the aryl radical and two radicals $R^{20A}$ may also be joined to form a five- or six-membered ring and p is 0 when $E^{6A}$-$E^{9A}$ is nitrogen and is 1 when $E^{6A}$-$E^{9A}$ is carbon.

In particular, 0 or 1 $E^{6A}$-$E^{9A}$ are nitrogen and the remainder are carbon. A is particularly preferably a 2-pyridyl, 6-methyl-2-pyridyl, 4-methyl-2-pyridyl, 5-methyl-2-pyridyl, 5-ethyl-2-pyridyl, 4,6-dimethyl-2-pyridyl, 3-pyridazyl, 4-pyrimidyl, 6-methyl-4-pyrimidyl, 2-pyrazinyl, 6-methyl-2-pyrazinyl, 5-methyl-2-pyrazinyl, 3-methyl-2-pyrazinyl, 3-ethylpyrazinyl, 3,5,6-trimethyl-2-pyrazinyl, 2-quinolyl, 4-methyl-2-quinolyl, 6-methyl-2-quinolyl, 7-methyl-2-quinolyl, 2-quinoxalyl or 3-methyl-2-quinoxalyl.

Owing to the ease of preparation, preferred combinations of Z and A are those in which Z is unsubstituted or substituted 1,2-phenylene and A is $NR^{16A}R^{17A}$ and those in which Z is —$CHR^{6A}$—, —$CH_2$—, —$C(CH_3)_2$ or —$Si(CH_3)_2$— and A is unsubstituted or substituted 2-quinolyl or unsubstituted or substituted 2-pyridyl. Systems without a bridge Z, in which k is 0, are also very particularly simple to synthesize. A is preferably unsubstituted or substituted 8-quinolyl in this case. In addition, when k is 0, $R^{2A}$ is preferably a $C_6$-$C_{22}$-aryl or an alkylaryl having from 1 to 10 carbon atoms in the alkyl part and 6-20 carbon atoms in the aryl part, preferably $C_6$-$C_{22}$-aryl such as phenyl, naphthyl, biphenyl, anthracenyl or phenanthrenyl, where the aryl may also be substituted by N-, P-, O- or S-containing substituents, $C_1$-$C_{22}$-alkyl, $C_2$-$C_{22}$-alkenyl, halogens or haloalkyls or haloaryls having 1-10 carbon atoms.

The preferred embodiments described above for the variables are also preferred in these preferred combinations.

$M^A$ is a metal selected from the group consisting of titanium in the oxidation state 3, vanadium, chromium, molybdenum and tungsten, preferably titanium in the oxidation state 3 and chromium. Particular preference is given to chromium in the oxidation states 2, 3 and 4, in particular 3. The metal complexes, in particular the chromium complexes, can be obtained in a simple manner by reacting the appropriate metal salts, e.g. metal chlorides, with the ligand anion (e.g. using a method analogous to the examples in DE 197 10615).

Among the suitable monocyclopentadienyl complexes (A1), preference is given to those of the formula Cp-$Y_m M^A X_n$ (V) where the variables Cp, Y, A, m and $M^A$ are as defined above and their preferred embodiments are also preferred here and:

$X^A$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{21A}R^{22A}$, $OR^{21A}$, $SR^{21A}$, $SO_3R^{21A}$, $OC(O)R^{21A}$, CN, SCN, β-diketonate, CO, $BF_4^-$, $PF_6^-$ or a bulky noncoordinating anion or two radicals $X^A$ form a substituted or unsubstituted diene ligand, in particular a 1,3-diene ligand, and the radicals $X^A$ may be joined to one another, $R^{21A}$-$R^{22A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{23A}_3$, where the organic radicals $R^{21A}$-$R^{22A}$ may also be substituted by halogens or nitrogen- and oxygen-containing groups and two radicals $R^{21A}$-$R^{22A}$ may also be joined to form a five- or six-membered ring, the radicals $R^{23A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part and two radicals $R^{23A}$ may also be joined to form a five- or six-membered ring and n is 1, 2, or 3.

The embodiments and preferred embodiments described above for Cp, Y, Z, A, m and $M^A$ also apply individually and in combination to these preferred monocyclopentadienyl complexes.

The ligands $X^A$ result, for example, from the choice of the appropriate starting metal compounds used for the synthesis of the monocyclopentadienyl complexes, but can also be varied afterwards. Possible ligands $X^A$ are, in particular, the halogens such as fluorine, chlorine, bromine or iodine, especially chlorine. Alkyl radicals such as methyl, ethyl, propyl, butyl, vinyl, allyl, phenyl or benzyl are also advantageous ligands $X^A$. Further ligands $X^A$ which may be mentioned, purely by way of example and in no way exhaustively, are trifluoroacetate, $BF_4^-$, $PF_6^-$ and also weakly coordinating or noncoordinating anions (cf., for example, S. Strauss in Chem. Rev. 1993, 93, 927-942), e.g. $B(C_6F_5)_4^-$.

Amides, alkoxides, sulfonates, carboxylates and β-diketonates are also particularly useful ligands $X^A$. Variation of the radicals $R^{21A}$ and $R^{22A}$ enables, for example, physical properties such as solubility to be finely adjusted. Possible carboorganic substituents $R^{21A}$-$R^{22A}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, 2-methoxyphenyl, 2-N,N-dimethylaminophenyl or arylalkyl, where the arylalkyl may be substituted by further alkyl groups, e.g. benzyl, o-, m-, p-methylbenzyl, 1- or 2-ethylphenyl, where $R^{21A}$ may also be joined to $R^{22A}$ to form a 5- or 6-membered ring and the organic radicals $R^{21A}$-$R^{22A}$ may also be substituted by halogens such as fluorine, chlorine or bromine. Possible radicals $R^{23A}$ in organosilicon substituents $SiR^{23A}_3$ are the same radicals as have been mentioned above for $R^{21A}$-$R^{22A}$, where two $R^{23A}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl and also vinyl allyl, benzyl and phenyl as radicals $R^{21A}$ and $R^{22A}$. Some of these substituted ligands X are particularly preferably used since they are obtainable from cheap and readily available starting materials. Thus, a particularly preferred embodiment is that in which $X^A$ is dimethylamide, methoxide, ethoxide, isopropoxide, phenoxide, naphthoxide, triflate, p-toluenesulfonate, acetate or acetylacetonate.

The number n of ligands $X^A$ depends on the oxidation state of the transition metal $M^A$. The number n can thus not be given in general terms. The oxidation state of transition metals $M^A$ in catalytically active complexes is usually known to those skilled in the art. Chromium, molybdenum and tungsten are very probably present in the oxidation state +3, vanadium in the oxidation state +3 or +4. However, it is also possible to use complexes whose oxidation state does not correspond to that of the active catalyst. Such complexes can then be appropriately reduced or oxidized by means of suitable activators. Preference is given to using chromium complexes in the oxidation state +3 and titanium complexes in the oxidation state 3.

Preferred monocyclopentadienyl complexes (A1) of this type are 1-(8-quinolyl)-3-phenylcyclopentadienylchromium (III) dichloride, 1-(8-quinolyl)-3-(1-naphthyl)cyclopentadienylchromium(III) dichloride, 1-(8-quinolyl)-3-(4-trifluoromethylphenyl)cyclopentadienylchromium(III) dichloride, 1-(8-quinolyl)-3-(4-chlorophenyl)cyclopentadienylchromium(III) dichloride, 1-(8-quinolyl)-2-methyl-3-phenylcyclopentadienylchromium(III) dichloride, 1-(8-quinolyl)-2-methyl-3-(1-naphthyl)cyclopentadienylchromium(III) dichloride, 1-(8-quinolyl)-2-methyl-3-(4-trifluoromethylphenyl)cyclopentadienylchromium(III) dichloride, 1-(8-quinolyl)-2-methyl-3-(4-chlorophenyl)cyclopentadienylchromium(III) dichloride, 1-(8-quinolyl)-2-phenylindenylchromium(III) dichloride, 1-(8-quinolyl)-2-phenylbenzindenylchromium(III) dichloride, 1-(8-(2-methylquinolyl))-2-methyl-3-phenylcyclopentadienylchromium(III) dichloride, 1-(8-(2-methylquinolyl))-2-phenylindenylchromium(III) dichloride, 1-(2-pyridylmethyl)-3-phenylcyclopentadienylchromium (III) dichloride, 1-(2-pyridylmethyl)-2-methyl-3-phenylcyclopentadienylchromium(III) dichloride, 1-(2-quinolylmethyl)-3-phenylcyclopentadienylchromium dichloride, 1-(2-pyridylethyl)-3-phenylcyclopentadienylchromium dichloride, 1-(2-pyridyl-1-methylethyl)-3-phenylcyclopentadienylchromium dichloride, 1-(2-pyridyl-1-phenylmethyl)-3-phenylcyclopentadienylchromium dichloride, 1-(2-pyridylmethyl)indenylchromium(III) dichloride, 1-(2-quinolylmethyl)indenylchromium dichloride, 1-(2-pyridylethyl)indenylchromium dichloride, 1-(2-pyridyl-1-methylethyl)indenylchromium dichloride, 1-(2-pyridyl-1-phenylmethyl)-indenylchromium dichloride, 5-[(2-pyridyl)methyl]-1,2,3,4-tetramethylcyclopentadienylchromium dichloride and 1-(8-(2-methylquinolyl))-2-methylbenzindenylchromium(III) dichloride.

The preparation of such functional cyclopentadienyl ligands is known. Various synthetic routes to these complexing ligands are described by, for example, M. Enders et al., in Chem. Ber. (1996), 129, 459-463 or P. Jutzi and U. Siemeling in J. Orgmet. Chem. (1995), 500, 175-185.

The synthesis of such complexes can be carried out by methods known per se, with the reaction of the appropriately substituted, cyclic hydrocarbon anions with halides of titanium, vanadium or chromium being preferred. Examples of appropriate preparative methods are described, for example, in Journal of Organometallic Chemistry, 369 (1989), 359-370 and in EP-A-1212333.

Particularly suitable hafnocenes (A2) are hafnium complexes of the general formula (VI)

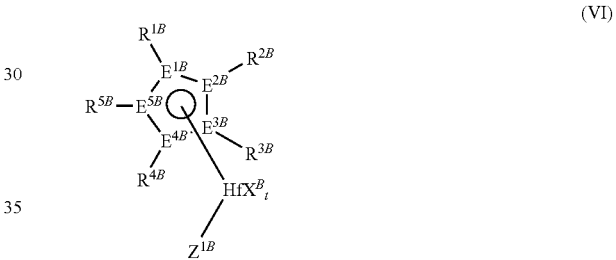

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (VI) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}_2$, $N(SiR^{8B}_3)_2$, $OR^{8B}$, $OSiR^{8B}_3$, $SiR^{8B}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where
the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and
$Z^{1B}$ is $X^B$ or

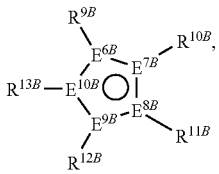

where the radicals
$R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}_2$, $N(SiR^{14B}_3)_2$, $OR^{14B}$, $OSiR^{14B}_3$, $SiR^{14B}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where
the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy,
$E^{6B}$-$E^{10B}$ are each carbon or not more than one $E^{6B}$ to $E^{10B}$ is phosphorus or nitrogen, preferably carbon,
or where the radicals $R^{4B}$ and $Z^{1B}$ together form an —$R^{15B}_v$-$A^{1B}$- group, where
$R^{15B}$ is

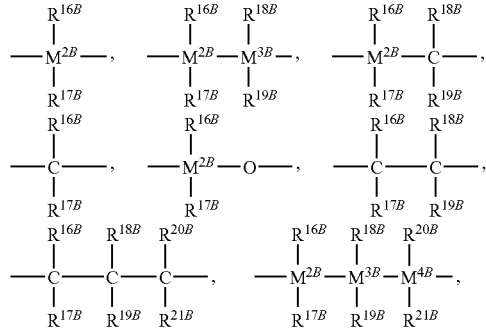

=$BR^{16B}$, =$BNR^{16B}R^{17B}$, =$AlR^{16B}$, —Ge—, —Sn—, —O—, —S—, =SO, =$SO_2$, =$NR^{16B}$, =CO, =$PR^{16B}$ or =$P(O)R^{16B}$,
where
$R^{16B}$-$R^{21B}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and
$M^{2B}$-$M^{4B}$ are each silicon, germanium or tin, or preferably silicon,
$A^{1B}$ is —O—, —S—,

=O, =S, =$NR^{22B}$, —O—$R^{22B}$, —$NR^{22B}_2$, —$PR^{22B}_2$ or an unsubstituted, substituted or fused, heterocyclic ring system, where
the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or $Si(R^{23B})_3$,
$R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl,
v is 1 or when $A^{1B}$ is an unsubstituted, substituted or fused, heterocyclic ring system may also be 0
or where the radicals $R^{4B}$ and $R^{12B}$ together form an —$R^{15B}$— group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, $3^{rd}$ revised edition, Verlag Chemie, Weinheim 1957.

The radicals $X^B$ in the general formula (XIV) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes (A2) are, inter alia, methylenebis(cyclopentadienyl)hafnium dichloride, methylenebis(3-methylcyclopentadienyl)hafnium dichloride, methylenebis(3-n-butylcyclopentadienyl)hafnium dichloride, methylenebis(indenyl)hafnium dichloride, methylenebis(tetrahydroindenyl) hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl)hafnium dichloride, isopropylidenebis(3-phenylcyclopentadienyl)hafnium dichloride, isopropylidenebis(indenyl)hafnium dichloride, isopropylidenebis(tetrahydroindenyl)hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl)hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl)hafnium dichloride, methylphenylsilanediylbis(2-methyl-4,5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl)hafnium dichloride, diphenylsilanediylbis(2-methylindenyl)hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl)hafnium dichloride, dimethylsilanediylbis(2-ethyl-4-(1-naphthyl)indenyl)hafnium dichloride, dimethylsilanediylbis(2-propyl-4-(1-naphthyl)indenyl)hafnium dichloride, dimethylsilanediylbis(2-i-butyl-4-(1-naphthyl)indenyl)hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl)hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]indenyl)hafnium dichloride, dimethylsilanediylbis(2-propyl-4-[4'-tert-butylphenyl]indenyl)hafnium dichloride, dimethylsilanediylbis(2-isopropyl-4-[4'-tert-butylphenyl]-indenyl)hafnium dichloride, dimethylsilanediylbis(2-n-butyl-4-[4'-tert-butylphenyl]indenyl)hafnium dichloride, dimethylsilanediylbis(2-hexyl-4-[4'-tert-butylphenyl]indenyl)hafnium dichloride, dimethylsilanediyl(2-isopropyl-4-phenylindenyl)(2-methyl-4-phenylindenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl]indenyl)(2-methyl-4-[4'-tert-butylphenyl]indenyl)hafnium dichloride, dimethylsilanediyl(2-isopropyl-4-[4'-tert-butylphenyl]-indenyl)(2-ethyl-4-[4'-tert-butylphenyl]indenyl)hafnium dichloride, dimethylsilanediyl(2-isopropyl-4-[4'-tert-butylphenyl]indenyl)(2-methyl-4-[3',5'-bis-tert-butylphenyl]indenyl)hafnium dichloride, dimethylsilanediyl(2-isopropyl-4-[4'-tert-butylphenyl]indenyl)(2-methyl-4-[1'-naphthyl]indenyl) hafnium dichloride and ethylene(2-isopropyl-4-[4'-tert-butylphenyl]indenyl)(2-methyl-4-[4'-tert-butylphenyl]indenyl) hafnium dichloride, and also the corresponding dimethylhafnium, monochloro-mono(alkylaryloxy)hafnium and di(alkylaryloxy)hafnium compounds. The complexes can be used in the rac form, the meso form or as mixtures of these.

Among the hafnocenes of the general formula (VI), those of the formula (VII)

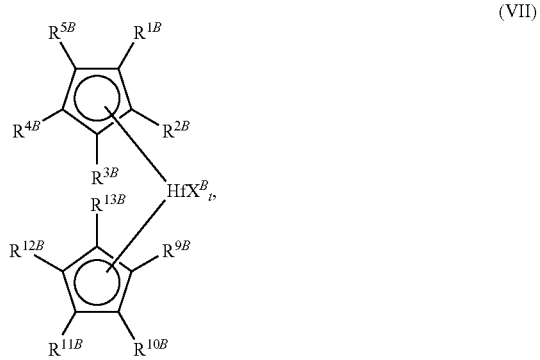

are preferred.

Among the compounds of the formula (VII), preference is given to those in which $X^B$ is fluorine, chlorine, bromine, $C_1$-$C_4$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and $R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (VII) in which the cyclopentadienyl radicals are identical are particularly useful.

Examples of particularly suitable compounds D) of the formula (VII) are, inter alia: bis(cyclopentadienyl)hafnium dichloride, bis(indenyl)hafnium dichloride, bis(fluorenyl) hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Suitable catalysts B) are transition metal complexes with at least one ligand of the general formulae XV to XIX,

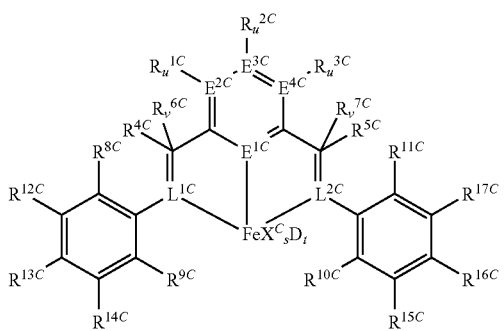

where the variables have the following meanings:
$E^{1C}$ is nitrogen or phosphorus, in particular nitrogen,
$E^{2C}$-$E^{4C}$ are each, independently of one another, carbon, nitrogen or phosphorus, in particular carbon,
$R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S,
$R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring, and/or two geminal or vicinal radicals $R^{4C}$-$R^{9C}$ are joined to form a five-, six- or seven-membered heterocycle containing at least one atom from the group consisting of N, P, O and S, and when v is 0, $R^{8C}$ is a bond to $L^{1C}$ and/or $R^{7C}$ is a bond to $L^{2C}$ so that $L^{1C}$ forms a double bond to the carbon atom bearing Roc and/or $L^{2C}$ forms a double bond to the carbon atom bearing $R^{5C}$,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S,
the indices v are each, independently of one another, 0 or 1,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens or nitrogen- and oxygen-containing groups and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring,
s is 1, 2, 3 or 4, in particular 2 or 3,
D is an uncharged donor and
t is from 0 to 4, in particular 0, 1 or 2.

The three atoms $E^{2C}$ to $E^{4C}$ in a molecule can be identical or different. If $E^{1C}$ is phosphorus, then $E^{2C}$ to $E^{4C}$ are preferably each carbon. If $E^{1C}$ is nitrogen, then $E^{2C}$ to $E^{4C}$ are each preferably nitrogen or carbon, in particular carbon.

The substituents $R^{1C}$-$R^{3C}$ and $R^{8C}$-$R^{17C}$ can be varied within a wide range. Possible carboorganic substituents $R^{1C}$-$R^{3C}$ and $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1C}$ to $R^{3C}$ and/or two vicinal radicals $R^{8C}$-$R^{17C}$ may also be joined to form a 5-, 6- or 7-membered ring and/or two of the vicinal radicals $R^{1C}$-$R^{3C}$ and/or two of the vicinal radicals $R^{8C}$-$R^{17C}$ may be joined to form a five-, six- or seven-membered heterocycle containing at least one atom from the group consisting of N, P, O and S and/or the organic radicals $R^{1C}$-$R^{3C}$ and/or $R^{8C}$-$R^{17C}$ may also be substituted by halogens such as fluorine, chlorine or bromine. Furthermore, $R^{1C}$-$R^{3C}$ and $R^{8C}$-$R^{17C}$ can also be amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{9C}$ and $R^{11C}$ are each a halogen such as fluorine, chlorine or bromine. Particular preference is given to $R^{8C}$ and $R^{10C}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{9C}$ and $R^{11C}$ are each a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The substituents $R^{4C}$-$R^{7C}$, too, can be varied within a wide range. Possible carboorganic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two radicals $R^{4C}$ to $R^{7C}$ may also be joined to form a 5-, 6- or 7-membered ring and/or two geminal radicals $R^{4C}$-$R^{7C}$ may be joined to form a five-, six- or seven-membered heterocycle containing at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino $NR^{18C}_2$ or $N(SiR^{19C}_3)_2$, for example dimethylamino, N-pyrrolidinyl or picolinyl. Possible radicals $R^{19C}$ in organosilicone substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound via nitrogen to the carbon bearing them. When v is 0, $R^{BC}$ is a bond to $L^{1c}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{8C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, in particular nitrogen, and when v is 0 can form a double bond with the carbon atom bearing $R^{4C}$ or $R^{5C}$. In particular, when v is 0, $L^{1C}$ and/or $L^{2C}$ together with the carbon atom bearing $R^{4C}$ or $R^{5C}$ form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ forms, in particular, an amido group —$CR^{4C}R^{6C}$—$N^-$— or —$CR^{5C}R^{7C}$—$N^-$—.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_6)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible carboorganic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

In a preferred embodiment are

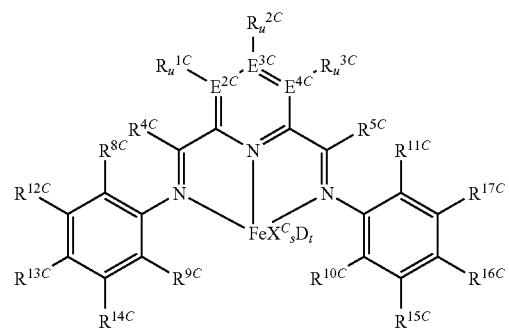

where
$E^{2C}$-$E^{4C}$ are each, independently of one another, carbon, nitrogen or phosphorus, in particular carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S,
$R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{5C}$ may also be substituted by halogens,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O or S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The embodiments and preferred embodiments described above likewise apply to $E^{2C}$-$E^{4C}$, $R^{1C}$-$R^{3C}$, $X^C$, $R^{18C}$ and $R^{19C}$.

The substituents $R^{4C}$-$R^{5C}$ can be varied within a wide range. Possible carboorganic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{4C}$-$R^{5C}$ may also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. Possible radicals $R^{19C}$ in organosilicon substituents $SiR^{19C}_3$ are the same carboorganic radicals as described above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{8C}$-$R^{17C}$ can be varied within a wide range. Possible carboorganic substituents $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert-butylsilyloxy.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular $R^{8C}$ and $R^{19C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{9C}$ and $R^{11C}$ are each a halogen such as fluorine, chlorine or bromine. Particular preference is given to $R^{8C}$ and $R^{10C}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{9C}$ and $R^{11C}$ each being a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The preparation of the compounds B) is described, for example, in J. Am. Chem. Soc. 120, p. 4049 ff. (1998), J. Chem. Soc., Chem. Commun. 1998, 849, and WO 98/27124. Preferred complexes B) are 2,6-diacetylpyridinebis(2,6-dimethylphenylimine)iron dichloride, 2,6-diacetylpyridinebis(2,4,6-trimethylphenylimine)iron dichloride, 2,6-diacetylpyridinebis(2-chloro-6-methylphenylimine)iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis (2,6-diisopropylphenylimine)iron dichloride, diacetylpyridinebis(2,6-dichlorophenylimine)iron dichloride, diacetylpyridinebis(2,6-difluorophenylimine)iron dichloride, diacetylpyridinebis(2,6-dibromophenylimine)iron dichloride or the respective dibromides or tribromides.

In the following, reference to a transition metal complex (A) or catalyst (A) means a monocyclopentadienyl complex (A1) and/or a hafnocene (A2). The molar ratio of transition metal complex A) to polymerization catalyst B) is usually in the range from 1:100 to 100:1, preferably from 1:10 to 10:1 and particularly preferably from 1:5 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A1), (A2) and (B) are likewise preferred in combinations of complex (A1) and (B) and in the combination of complex (A2) and (B).

The catalyst composition of the invention can be used alone or together with further components as catalyst system for olefin polymerization. Furthermore, we have found catalyst systems for olefin polymerization comprising
A) at least one polymerization catalyst based on a monocyclopentadienyl complex of a metal of groups 4-6 of the Periodic Table of the Elements whose cyclopentadienyl system is substituted by an uncharged donor (A1) or a hafnocene (A2),
B) at least one polymerization catalyst based on an iron component having a tridentate ligand bearing at least two ortho, ortho-disubstituted aryl radicals,
C) optionally one or more activating compounds,
D) optionally one or more organic or inorganic supports,
E) optionally one or more metal compounds of a metal of group 1, 2 or 13 of the Periodic Table.

In the following, reference to a transition metal complex (A) or catalyst (A) means a monocyclopentadienyl complex (A1) and/or a hafnocene (A2). The molar ratio of transition metal complex A) to polymerization catalyst B) is usually in the range from 1:100 to 100:1, preferably from 1:10 to 10:1 and particularly preferably from 1:5 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A1), (A2) and (B) are likewise preferred in combinations of complex (A1) and (B) and in the combination of complex (A2) and (B).

The monocyclopentadienyl complexes (A1), the hafnocene (A2) and/or the iron complex (B) sometimes have only a low polymerization activity and are then brought into contact with one or more activators, viz. the component (C), in order to be able to display a good polymerization activity. The catalyst system therefore optionally further comprises, as component (C) one or more activating compounds, preferably one or two activating compounds (C). The catalyst system of the invention preferably comprises one or more activators (C). Depending on the catalyst combinations (A) and (B), one or more activating compounds (C) are advantageous. The activation of the transition metal complex (A) and of the iron complex (B) of the catalyst composition can be carried out using the same activator or activator mixture or different activators. It is often advantageous to use the same activator (C) for both the catalysts (A) and (B).

The activator or activators (C) can in each case be used in any amounts based on the complexes (A) and (B) of the catalyst composition of the invention. They are preferably used in an excess or in stoichiometric amounts, in each case based on the complex (A) or (B) which they activate. The amount of activating compound(s) to be used depends on the type of the activator (C). In general, the molar ratio of transition metal complex (A) to activating compound (C) can be from 1:0.1 to 1:10000, preferably from 1:1 to 1:2000. The molar ratio of iron complex (B) to activating compound (C) is also usually in the range from 1:0.1 to 1:10000, preferably from 1:1 to 1:2000.

Suitable compounds (C) which are able to react with the transition metal complex (A) or the iron complex (B) to convert it into a catalytically active or more active compound are, for example, compounds such as an aluminoxane, a strong uncharged Lewis acid, an ionic compound having a Lewis-acid cation or an ionic compound containing a Brönsted acid as cation.

As aluminoxanes, it is possible to use, for example, the compounds described in WO 00/31090. Particularly useful aluminoxanes are open-chain or cyclic aluminoxane compounds of the general formula (X) or (XI)

where $R^{1D}$-$R^{4D}$ are each, independently of one another, a $C_1$-$C_6$-alkyl group, preferably a methyl, ethyl, butyl or isobutyl group and l is an integer from 1 to 40, preferably from 4 to 25.

A particularly useful aluminoxane compound is methylaluminoxane.

These oligomeric aluminoxane compounds are usually prepared by controlled reaction of a solution of a trialkylaluminum, in particular trimethylaluminum, with water. In general, the oligomeric aluminoxane compounds obtained are in the form of mixtures of both linear and cyclic chain molecules of various lengths, so that l is to be regarded as a mean. The aluminoxane compounds can also be present in admixture with other metal alkyls, usually aluminum alkyls. Aluminoxane preparations suitable as component (C) are commercially available.

Furthermore modified aluminoxanes in which some of the hydrocarbon radicals have been replaced by hydrogen atoms or alkoxy, aryloxy, siloxy or amide radicals can also be used in place of the aluminoxane compounds of the formula (X) or (XI) as component (C).

It has been found to be advantageous to use the transition metal complex A) or the iron complex B) and the aluminoxane compounds in such amounts that the atomic ratio of aluminum from the aluminoxane compounds including any aluminum alkyl still present to the transition metal from the transition metal complex (A) is in the range from 1:1 to 2000:1, preferably from 10:1 to 500:1 and in particular in the range from 20:1 to 400:1. The atomic ratio of aluminum from the aluminoxane compounds including any aluminum alkyl still present to the iron from the iron complex (B) is usually in the range from 1:1 to 2000:1, preferably from 10:1 to 500:1 and in particular in the range from 20:1 to 400:1.

A further class of suitable activating components (C) are hydroxyaluminoxanes. These can be prepared, for example, by addition of from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the transition metal complex (A) or the iron complex (B) is usually in the range from 1:1 to 100:1, preferably from 10:1 to 50:1 and in particular in the range from 20:1 to 40:1. Preference is given to using a monocyclopentadienyl metall dialkyl compound (A1) or a hafnocene dialkyl compound (A2).

As strong, uncharged Lewis acids, preference is given to compounds of the general formula (XII)

where
$M^{2D}$ is an element of group 13 of the Periodic Table of the Elements, in particular B, Al or Ga, preferably B,
$X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl part and from 6 to 20 carbon atoms in the aryl part or fluorine, chlorine, bromine or iodine, in particular haloaryls, preferably pentafluorophenyl.

Further examples of strong, uncharged Lewis acids are given in WO 00/31090.

Compounds which are particularly useful as component (C) are boranes and boroxins such as trialkylborane, triarylborane or trimethylboroxin. Particular preference is given to using boranes which bear at least two perfluorinated aryl radicals. Particular preference is given to compounds of the general formula (XII) in which $X^{1D}$, $X^{2D}$ and $X^{3D}$ are identical, for example triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane. Preference is given to using tris(pentafluorophenyl)borane.

Suitable compounds (C) are preferably prepared by reaction of aluminum or boron compounds of the formula (XII) with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis(pentafluorophenyl)methanol and 4-hydroxy-2,2',3,3',4,4',5,5',6,6'-nonafluorobiphenyl.

Examples of combinations of compounds of the formula (XII) with Broenstedt acids are, in particular, trimethylaluminum/pentafluorophenol, trimethylaluminum/1-bis(pentafluorophenyl)methanol, trimethylaluminum/4-hydroxy-2, 2',3,3',4,4',5,5',6,6'-nonafluorobiphenyl, triethylaluminum/pentafluorophenol and triisobutylaluminum/pentafluorophenol and triethylaluminum/4,4'-dihydroxy-2, 2',3,3',5,5',6,6'-octafluorobiphenyl hydrate.

In further suitable aluminum and boron compounds of the formula (XII), $R^{1D}$ is an OH group, such as, for example, in boronic acids and borinic acids. Particular mention may be made of borinic acids having perfluorinated aryl radicals, for example $(C_6F_5)_2BOH$.

Strong uncharged Lewis acids suitable as activating compounds (C) also include the reaction products of the reaction of a boronic acid with two equivalents of an aluminum trialkyl or the reaction products of the reaction of an aluminum trialkyl with two equivalents of an acidic fluorinated, in particular perfluorinated, carbon compound such as pentafluorophenol or bis(pentafluorophenyl)borinic acid.

Suitable ionic compounds having Lewis-acid cations include salt-like compounds of the cation of the general formula (XIII)

where
$M^{3D}$ is an element of groups 1 to 16 of the Periodic Table of the Elements,
$Q_1$ to $Q_z$ are simply negatively charged radicals such as $C_1$-$C_{28}$-alkyl, $C_6$-$C_{15}$-aryl, alkylaryl, arylalkyl, haloalkyl, haloaryl each having from 6 to 20 carbon atoms in the aryl part and from 1 to 28 carbon atoms in the alkyl part, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups,
a is an integer from 1 to 6 and
z is an integer from 0 to 5,
d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms with the boron or aluminium compound an ionizing ionic compound, e.g. triphenylchloromethane, or optionally a base, preferably an organic nitrogen-containing base, for example an amine, an aniline derivative or a nitrogen heterocycle. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds containing anionic boron heterocycles as are described in WO 9736937 are also suitable as component (C), in particular dimethylanilinium boratabenzenes or trityl boratabenzenes.

Preferred ionic compounds C) contain borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions to be joined to one another, as in the dianion $[(C_6F_5)_2B-C_6F_4-B(C_6F_5)_2]^{2-}$, or the borate anion can be bound via a bridge to a suitable functional group on the support surface.

Further suitable activating compounds (C) are listed in WO 00/31090.

The amount of strong, uncharged Lewis acids, ionic compounds having Lewis-acid cations or ionic compounds containing Brönsted acids as cations is preferably from 0.1 to 20 equivalents, more preferably from 1 to 10 equivalents and particularly preferably from 1 to 2 equivalents, based on the transition metal complex (A) or the iron complex (B).

Suitable activating compounds (C) also include boron-aluminum compounds such as di[bis(pentafluorophenylboroxy)]methylalane. Examples of such boron-aluminum compounds are those disklosed in WO 99/06414.

It is also possible to use mixtures of all the abovementioned activating compounds (C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane or a boroxin.

Both the transition metal complex (A) or the iron complex (B) and the activating compounds (C) are preferably used in a solvent, preferably an aromatic hydrocarbon having from 6 to 20 carbon atoms, in particular xylenes, toluene, pentane, hexane, heptane or a mixture thereof.

A further possibility is to use an activating compound (C) which can simultaneously be employed as support (D). Such systems are obtained, for example, from an inorganic oxide treated with zirconium alkoxide and subsequent chlorination, e.g. by means of carbon tetrachloride. The preparation of such systems is described, for example, in WO 01/41920.

Combinations of the preferred embodiments of (C) with the preferred embodiments of (A) and/or (B) are particularly preferred.

As joint activator (C) for the catalyst component (A) and (B), preference is given to using an aluminoxane. Preference is also given to the combination of salt-like compounds of the cation of the general formula (XIII), in particular N,N-dimethylanilinium tetrakis(pentafluorophenyl)borate, N,N-dimethylcyclohexylammonium tetrakis(pentafluorophenyl)borate, N,N-dimethylbenzylammonium tetrakis (pentafluorophenyl)borate or trityl tetrakispentafluorophenylborate, as activator (C) for hafnocenes (A2), in particular in combination with an aluminoxane as activator (C) for the iron complex (B).

Further particularly useful joint activators (C) are the reaction products of aluminum compounds of the formula (XII) with perfluorinated alcohols and phenols.

To enable the transition metal complex (A) and the iron complex (B) to be used in polymerization processes in the gas phase or in suspension, it is often advantageous to use the complexes in the form of a solid, i.e. for them to be applied to a solid support (D). Furthermore, the supported complexes have a high productivity. The transition metal complexes (A) and/or the iron complex (B) can therefore also optionally be immobilized on an organic or inorganic support (D) and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Particular preference is given to a catalyst system comprising at least one transition metal complex (A), at least one iron complex (B), at least one activating compound (C) and at least one support component (D).

The preferred catalyst composition according to the invention comprises one or more support components. It is possible for both the transition metal component (A) and the iron complex (B) to be supported, or only one of the two components can be supported. In a preferred embodiment, both the components (A) and (B) are supported. The two components (A) and (B) can in this case be applied to different supports or together on a joint support. The components (A) and (B) are preferably applied to a joint support in order to ensure a relatively close spatial proximity of the various catalyst centers and thus to ensure good mixing of the different polymers formed.

To prepare the catalyst systems of the invention, preference is given to immobilizing one of the components (A) and one of the components (B) and/or activator (C) or the support (D) by physisorption or else by means of a chemical reaction, i.e. covalent binding of the components, with reactive groups on the support surface.

The order in which support component D), transition metal complex (A), iron complex (B) and the activating compounds (C) are combined is in principle immaterial. After the individual process steps, the various intermediates can be washed with suitable inert solvents such as aliphatic or aromatic hydrocarbons.

Transition metal complex (A), iron complex (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the transition metal complex (A) and/or the iron complex (B). Preactivation of the transition metal complex A) by means of one or more activating compounds (C) prior to mixing with the support (D) is also possible. The iron component can, for example, be reacted simultaneously with the transition metal complex with the activating compound (C), or can be preactivated separately by means of the latter. The preactivated iron complex (B) can be applied to the support before or after the preactivated transition metal complex (A). In one possible embodiment, the transition metal complex (A) and/or the iron complex (B) can also be prepared in the presence of the support material. A further method of immobilization is prepolymerization of the catalyst system with or without prior application to a support.

The immobilization is generally carried out in an inert solvent which can be removed by filtration or evaporation after the immobilization. After the individual process steps, the solid can be washed with suitably inert solvents such as aliphatic or aromatic hydrocarbons and dried. However, the use of the still moist, supported catalyst is also possible.

In a preferred method of preparing the supported catalyst system, at least one iron complex (B) is brought into contact with an activated compound (C) and subsequently mixed with the dehydrated or passivated support material (D). The transition metal complex (A) is likewise brought into contact with at least one activating compound (C) in a suitable solvent, preferably giving a soluble reaction product, an adduct or a mixture. The preparation obtained in this way is then mixed with the immobilized iron complex, which is used directly or after the solvent has been separated off, and the solvent is completely or partly removed. The resulting supported catalyst system is preferably dried to ensure that all or most of the solvent is removed from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly producing the activating compound (C) on the support component (D) and subsequently bringing this supported compound into contact with the transition metal complex (A) and the iron complex (B).

As support component (D), preference is given to using finely divided supports which can be any organic or inorganic solid. In particular, the support component (D) can be a porous support such as talc, a sheet silicate such as montmorillonite, mica or an inorganic oxide or a finely divided polymer powder (e.g. polyolefin or a polymer having polar functional groups).

The support materials used preferably have a specific surface area in the range from 10 to 1000 m²/g, a pore volume in the range from 0.1 to 5 ml/g and a mean particle size of from 1 to 500 μm. Preference is given to supports having a specific surface area in the range from 50 to 700 m²/g, a pore volume in the range from 0.4 to 3.5 ml/g and a mean particle size in the range from 5 to 350 μm. Particular preference is given to supports having a specific surface area in the range from 200 to 550 m²/g, a pore volume in the range from 0.5 to 3.0 ml/g and a mean particle size of from 10 to 150 μm.

The transition metal complex (A) is preferably applied in such an amount that the concentration of the transition metal from the transition metal complex (A) in the finished catalyst system is from 1 to 200 μmol, preferably from 5 to 100 μmol and particularly preferably from 10 to 70 μmol, per g of support (D). The iron complex (B) is preferably applied in such an amount that the concentration of iron from the iron complex (B) in the finished catalyst system is from 1 to 200 μmol, preferably from 5 to 100 μmol and particularly preferably from 10 to 70 μmol, per g of support (D).

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of the solid and/or set the desired OH concentration on the surface. The support can also be treated chemically using customary dessicants such as metal alkyls preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $NH_4SiF_6$ or other fluorinating agents leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. It is also possible to use polymer blends.

Inorganic oxides suitable as support component (D) may be found among the oxides of elements of groups 2, 3, 4, 5, 13, 14, 15 and 16 of the Periodic Table of the Elements. Examples of oxides preferred as supports include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, $AlPO_4$, $ZrO_2$, $TiO_2$, $B_2O_3$ or mixtures thereof.

Further preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

As solid support materials (D) for catalysts for olefin polymerization, preference is given to using silica gels since particles whose size and structure make them suitable as supports for olefin polymerization can be produced from this material. Spray-dried silica gels, which are spherical agglomerates of relatively small granular particles, i.e. primary particles, have been found to be particularly useful. The silica gels can be dried and/or calcined before use.

Further preferred supports (D) are hydrotalcites and calcined hydrotalcites. In mineralogy, hydrotalcite is a natural mineral having the ideal formula $$Mg_6Al_2(OH)_{16}CO_3.4H_2O$$

whose structure is derived from that of brucite $Mg(OH)_2$. Brucite crystallizes in a sheet structure with the metal ions in octahederal holes between two layers of close-packed hydroxyl ions, with only every second layer of the octahederal holes being occupied. In hydrotalcite, some magnesium ions are replaced by aluminum ions, as a result of which the packet of layers gains a positive charge. This is balanced by the anions which are located together with water of crystallization in the layers in-between.

Such sheet structures are found not only in magnesium-aluminum-hydroxides, but generally in mixed metal hydroxides of the general formula $$M(II)_{2x}^{2+}M(III)_2^{3+}(OH)_{4x+4}.A_{2/n}^{n-}.zH_2O$$

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is a number from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogen carbonate, nitrate, chloride, sulfate or $B(OH)_4^-$ or polyoxometal anions such as $Mo_7O_{24}^{6-}$ or $V_{10}O_{28}^{6-}$. However, a mixture of a plurality of such anions is also possible.

Accordingly, all such mixed metal hydroxides having a sheet structure should be regarded as hydrotalcites for the purposes of the present invention.

Calcined hydrotalcites can be prepared from hydrotalcites by calcination, i.e. heating, by means of which, inter alia, the desired hydroxide group content can be set. In addition, the crystal structure also changes. The preparation of the calcined hydrotalcites used according to the invention is usually carried out at temperatures above 180° C. Preference is given to calcination for a period of from 3 to 24 hours at temperatures of from 250° C. to 1000° C., in particular from 400° C. to 700° C. It is possible for air or inert gas to be passed over the solid or for a vacuum to be applied at the same time.

On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for 1 hour at 950° C. in a muffle furnace.

The calcined hydrotalcites used as component (D) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti and also chlorides and sulfates, can also be present.

Preferred calcined hydrotalcites (D) are mixed oxides in which M(II) is magnesium and M(III) is aluminum. Such aluminum-magnesium mixed oxides are obtainable from Condea Chemie GmbH (now Sasol Chemie), Hamburg under the trade name Puralox Mg.

Preference is also given to calcined hydrotalcites in which the structural transformation is complete or virtually complete. Calcination, i.e. transformation of the structure, can be confirmed, for example, by means of X-ray diffraction patterns.

The hydrotalcites, calcined hydrotalcites or silica gels used are generally used as finely divided powders having a mean particle diameter D50 of from 5 to 200 μm, preferably from 10 to 150 μm, particularly preferably from 15 to 100 μm and in particular from 20 to 70 μm, and usually have pore volumes of from 0.1 to 10 cm³/g, preferably from 0.2 to 5 cm³/g, and specific surface areas of from 30 to 1000 m²/g, preferably from 50 to 800 m²/g and in particular from 100 to 600 m²/g. The transition metal complex (A) is preferably applied in such an amount that the concentration of the transition metal from the transition metal complex (A) in the finished catalyst system is from 1 to 100 μmol, preferably from 5 to 80 μmol and particularly preferably from 10 to 60 μmol, per g of support (D).

The catalyst system may further comprise, as additional component (E), a metal compound of the general formula (XX),

$$M^G(R^{1G})_{r^G}(R^{2G})_{s^G}(R^{3G})_{t^G} \quad (XX)$$

where
$M^G$ is Li, Na, K, Be, Mg, Ca, Sr, Ba, boron, aluminum, gallium, indium, thallium, zinc, in particular Li, Na, K, Mg, boron, aluminum or Zn, $R^{1G}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part, $R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl part and from 6 to 20 carbon atoms in the aryl part, or alkoxy together with $C_1$-$C_{10}$-alkyl or $C_6$-$C_{15}$-aryl, $r^G$ is an integer from 1 to 3 and $s^G$ and $t^G$ are integers from 0 to 2, with the sum $r^G+s^G+t^G$ corresponding to the valence of $M^G$, where the component (E) is usually not identical to the component (C). It is also possible to use mixtures of various metal compounds of the formula (XX).

Among the metal compounds of the general formula (XX), preference is given to those in which
$M^G$ is lithium, magnesium, boron or aluminum and
$R^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound (E) is used, it is preferably present in the catalyst system in such an amount that the molar ratio of $M^G$ from formula (XX) to the sum of the transition metals from the transition metal complex (A) and the iron complex (B) is from 3000:1 to 0.1:1, preferably from 800:1 to 0.2:1 and particularly preferably from 100:1 to 1:1.

In general, the metal compound (E) of the general formula (XX) is used as constituent of a catalyst system for the polymerization or copolymerization of olefins. Here, the metal compound (E) can, for example, be used for preparing a catalyst solid comprising the support (D) and/or be added during or shortly before the polymerization. The metal compounds (E) used can be identical or different. It is also possible, particularly when the catalyst solid contains no activating component (C), for the catalyst system to further comprise, in addition to the catalyst solid, one or more activating compounds (C) which are identical to or different from any compounds (E) present in the catalyst solid.

The component E) can likewise be reacted in any order with the components (A), (B) and optionally (C) and (D). The component (A) can, for example, be brought into contact with the component(s) (C) and/or (D) either before or after being brought into contact with the olefins to be polymerized. Preactivation by means of one or more components (C) prior to mixing with the olefin and further addition of the same or another component (C) and/or (D) after this mixture has been brought into contact with the olefin is also possible. Preactivation is generally carried out at temperatures of 10-100° C., preferably 20-80° C.

In another preferred embodiment, a catalyst solid is prepared from the components (A), (B), (C) and (D) as described above and this is brought into contact with the component (E) during, at the commencement of or shortly before the polymerization.

Preference is given to firstly bringing (E) into contact with the α-olefin to be polymerized and subsequently adding the catalyst solid comprising the components (A), (B), (C) and (D) as described above.

In a further, preferred embodiment, the support (D) is firstly brought into contact with the component (E), and the components (A) and (B) and any further activator (C) are then dealt with as described above.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of transition metal compound (A) and iron complex (B) is usually from 1:1000 to 1000:1, preferably from 1:5 to 20:1.

The catalyst composition or catalyst system of the invention is suitable for preparing the polyethylene of the invention, which has advantageous use and processing properties.

To prepare the polyethylene of the invention, the ethylene is polymerized as described above with α-olefins having from 3 to 12 carbon atoms.

In the copolymerization process of the invention, ethylene is polymerized with α-olefins having from 3 to 12 carbon atoms. Preferred α-olefins are linear or branched $C_2$-$C_{12}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene. Particularly preferred α-olefins are $C_4$-$C_{12}$-1-alkenes, in particular linear $C_6$-$C_{10}$-1-alkenes. It is also possible to polymerize mixtures of various α-olefins. Preference is given to polymerizing at least one α-olefin selected from the group consisting of ethene, propene, 1-butene, 1-pentene, 1-hexene, 1-heptene, 1-octene and 1-decene. Monomer mixtures containing at least 50 mol % of ethene are preferably used.

The process of the invention for polymerizing ethylene with α-olefins can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or super-condensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations. To obtain the high proportions of vinyl groups, the polymerization is preferably carried out in the absence of hydrogen.

The polymerization is preferably carried out in a single reactor, in particular in a gas-phase reactor. The polymerization of ethylene with α-olefins having from 3 to 12 carbon atoms gives the polyethylene of the invention when the catalyst of the invention is used. The polyethylene powder obtained directly from the reactor displays a very high homogeneity, so that, unlike the case of cascade processes, subsequent extrusion is not necessary in order to obtain a homogeneous product.

The production of polymer blends by intimate mixing of individual components, for example by melt extrusion in an extruder or kneader (cf., for example, "Polymer Blends" in Ullmann's Encyclopedia of Industrial Chemistry, 6$^{th}$ Edition, 1998, Electronic Release), is often accompanied by particular difficulties. The melt viscosities of the high and low molecular weight components of a bimodal polyethylene blend are extremely different. While the low molecular weight component is quite fluid at the customary temperatures of about 190-210° C. used for producing the blends, the high molecular weight component is only softened ("lentil soup"). Homogeneous mixing of the two components is therefore for very difficult. In addition, it is known that the high molecular weight component can easily be damaged as a result of thermal stress and by shear forces in the extruder, so that the properties of the blend are adversely affected. The mixing quality of such polyethylene blends is therefore often unsatisfactory.

The mixing quality of the polyethylene powder obtained directly from the reactor can be tested by assessing thin slices ("microtome sections") of a sample under an optical microscope. Inhomogenities show up in the form of specks or "white spots". The specs or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 μm, cause stress cracks and result in brittle failure of components. The better the mixing quality of a polymer, the fewer and smaller are these inclusions observed. The mixing quality of a polymer is determined quantitatively in accordance with ISO 13949. According to the measurement method, a microtome section is prepared from a sample of the polymer, the number and size of these inclusions are counted and a grade is determined for the mixing quality of the polymer according to a set assessment scheme.

An important application of bimodal polyethylenes is their use for producing pressure pipes for the transport of gas, drinking water and wastewater. Pressure pipes made of polyethylene are increasingly replacing metal pipes. For this type of application, it is important that the pipe has a very long operating life without aging and brittle failure having to be feared. Even small flaws or notches in a pressure pipe can grow bigger even under low pressures and lead to brittle failure, with this process being able to be accelerated by increased temperatures and/or aggressive chemicals. It is therefore extremely important to reduce the number and size of the flaws in a pipe, for example specks or "white spots" as far as at all possible.

The preparation of the polyethylene of the invention in the reactor reduces the energy consumption, requires no subsequent blending processes and makes simple control of the molecular weight distributions and the molecular weight fractions of the various polymers possible. In addition, good mixing of the polyethylene is achieved.

The following examples illustrate the invention without restricting the scope of the invention.

The measured values described were determined in the following way:

NMR samples were placed in tubes under inert gas and, if appropriate, melted. The solvent signals served as internal standard in the $^1$H- and $^{13}$C-NMR spectra and their chemical shift was converted into the values relative to TMS.

The vinyl group content is determined by means of IR in accordance with ASTM D 6248-98. The determination of the vinyl group content in the 20% by weight of the polyethylene having the lowest molar masses is carried out by the method of Holtrup as described in W. Holtrup, Makromol. Chem. 178, 2335 (1977), coupled with IR, with the vinyl groups being determined in accordance with ASTM D 6248-98.

The branches/1000 carbon atoms are determined by means of $^{13}$C-NMR, as described by James. C. Randall, JMS-REV. Macromol. Chem. Phys., C29 (2&3), 201-317 (1989), and are based on the total content of $CH_3$ groups/1000 carbon atoms. The side chains larger than $CH_3$ and especially ethyl, butyl and hexyl side chain branches/1000 carbon atoms are likewise determined in this way.

The degree of branching in the individual polymer fractions is determined by the method of Holtrup (W. Holtrup, Makromol. Chem. 178, 2335 (1977)) coupled with $^{13}$C-NMR.

The density [$g/cm^3$] was determined in accordance with ISO 1183.

The determination of the molar mass distributions and the means Mn, Mw, and Mw/Mn derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 μl injection volume, temperature: 135° C., calibration using PE Standards. Evaluation was carried out using WIN-GPC.

The TREF studies were carried out under the following conditions: solvent: 1,2,4-trichlorobenzene, flow: 1 ml/min, heating rate: 1° C./min, amount of polymer: 5-10 mg, support: kieselguhr.

For the purposes of the present invention, the expression "HLMI" refers, as is generally known, to the "high load melt flow rate" and is always determined at 190° C. under a load of 21.6 kg (190° C./21.6 kg) in accordance with ISO 1133.

The CDBI values were determined as described in WO-A-93/03093.

Figure 1:
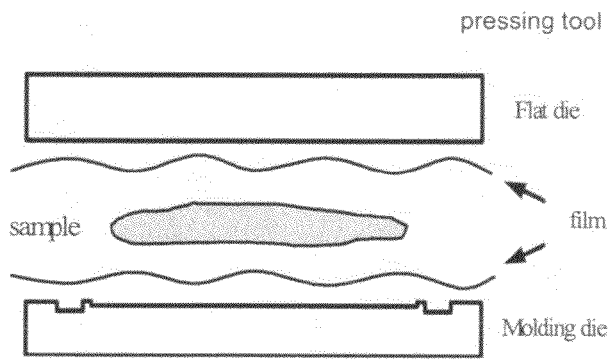
FIG. 1-4 represent schematic views of as many steps of a stress cracking resistance test carried out on the polyethylene of the invention.
Figure 2:
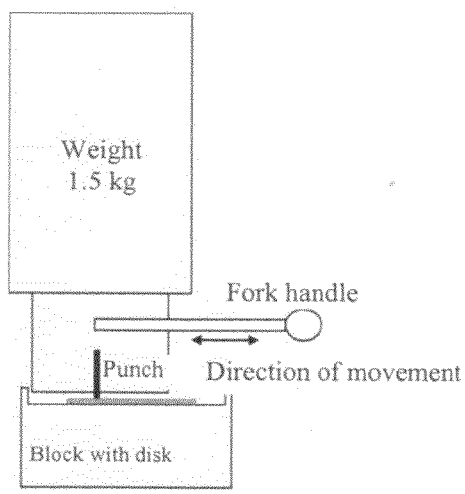

The stress cracking resistance ESCR was measured at 50° C. on round, disk-shaped test specimens (diameter: 38 mm, 1 mm thick (height), scored on one side by a groove having a length of 20 mm and a depth of 0.2 mm) which were dipped into a 5% Lutensol solution and loaded with a pressure of 3 bar. The time until occurrence of stress cracks (reported in h) is measured. The production of the test specimen was carried out using a WERNER&PFLEIDERER laboratory press URH 30 using an oil-hydraulic drive. The pressing tool is prepared as shown in FIG. 1. A square piece of Hostafan or cellophane film (l=210 mm, thickness: 0.02 mm) is placed on the shaping side of the molding die, about 12 g-18 g of the polymer sample are placed on this in the middle, another square piece of film is placed on top and covered by the flat die. The two metal parts should be positioned very precisely above one another. Pressing of the specimens is carried out at 180° C., 50 bar pressure for 5 minutes and subsequently at 200 bar for 30 minutes. The polymer plate is taken from the pressing tool in the press, the overhang is removed and the two films are pulled off the specimen. After storage for at least one day, five disks having a thickness of 1 mm±0.05 mm are stamped from the pressed plate (h=1 mm) using a hollow punch (d=38 mm). The thickness was checked beforehand at a plurality of points. Only dimensionally accurate test disks are employed for the determination. Notches are cut into the disks in succession in the notching apparatus by means of a punch which is operated under a predetermined weight, for example of 1.5 kg. The punch projects 200 μm (FIG. 2). The disk is carefully removed again from the block.

Figure 3:
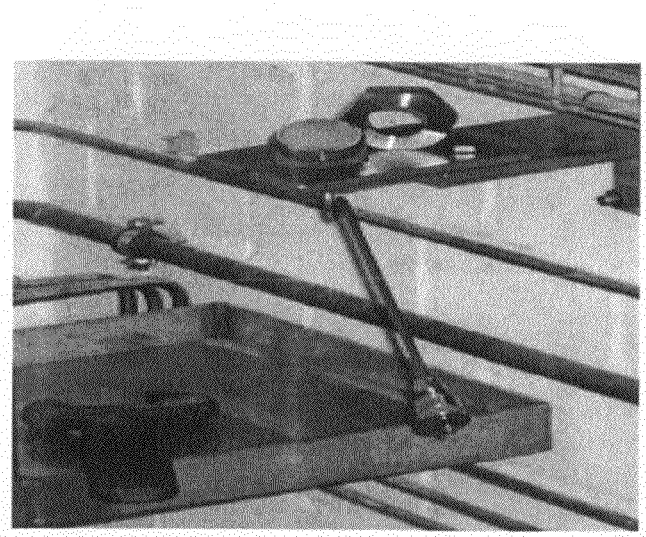
Figure 4:
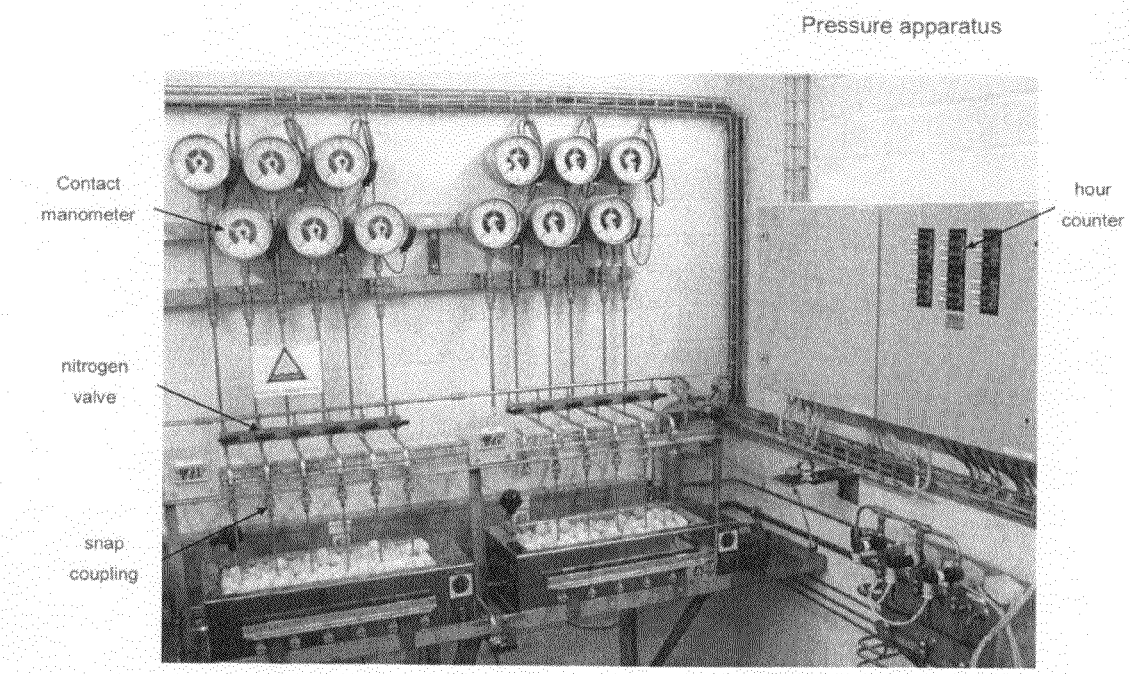
Figure 5:
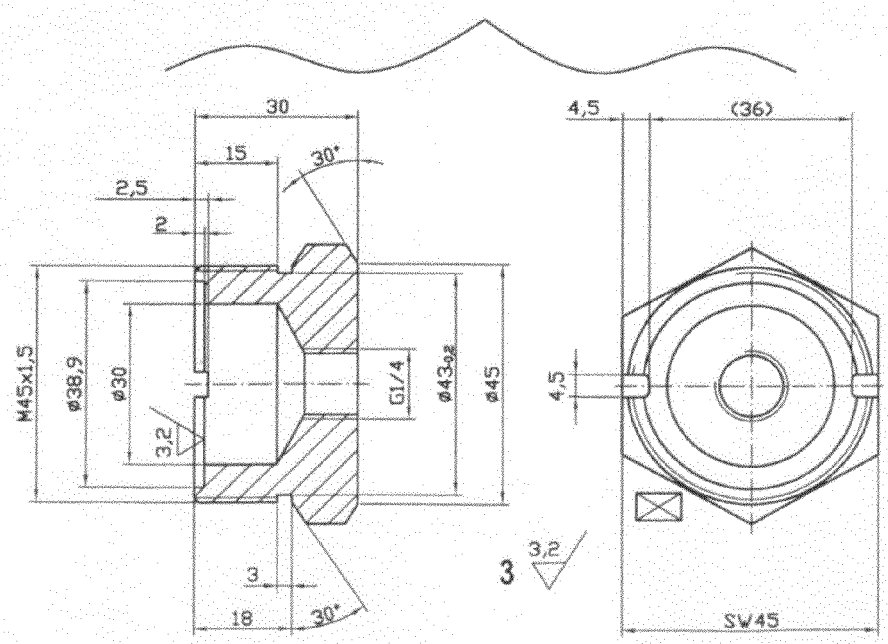
FIG. 5 shows a cross-sectional and, respectively, a top view of a measurement cell employed to perform said stress cracking resistance test.

The measurement cell, of which an example is shown in FIG. 5, is placed in the holder and filled to the upper rim with a 5% strength Lutensol solution from the squirting bottle. The sample disk is placed in the measurement cell with the notch facing outward. Care has to be taken that all of the disk comes into contact with the wetting agent. The nut is placed on top and is screwed firmly into place (FIG. 3). A pressure apparatus, shown in FIG. 4, may for example use nitrogen under pressure as a pressurizing means, whose pressure is measured by means of a contact manometer. The measurement cell is coupled to the pressure apparatus by means of the snap coupling. The pressure apparatus is equipped with a level regulator which feeds in the deionized water to replace any which has evaporated and ensure that the sample disk is always completely covered with solution of constant concentration during the determination. The sample disk is placed under a pressure of 3 bar and the hour counter is started (FIG. 4). When the damage criterion has occurred, the nitrogen escapes through the crack, the pressure drops and the hour counter is stopped automatically. The calculation is carried out from the hour mean of five specimens.

The mixing quality of polyethylene is determined in accordance with ISO 13949. Six microtome sections (thickness: >0.060 mm, diameter: 3-5 mm) are prepared from six different parts of one polyethylene specimen. The sections are assessed under a microscope at a magnification of 100, and the number and size of inclusions ("white spots", agglomerates, particles) on an area of 0.7 mm$^2$ is determined. Inclusions having a size below 0.005 mm are disregarded in accordance with ISO 13949. According to the classification table of ISO 13949, the grades 0, 0.5, 1, 1.5, 2, 2.5, 3, 3.5, 4, 4.5, 5, 5.5, 6, 6.5 or 7 are awarded according to the number and size of the inclusions. The overall grade is the arithmetic mean of the grades for all 6 specimens. The lower the grade, the fewer the inclusions present in the polyethylene and the better the mixing quality of the polyethylene.

Abbreviations in the table below:
Cat. Catalyst
T(poly) Polymerisation temperature
$M_w$ Weight average molar mass
$M_n$ Number average molar mass
Density Polymer density
Prod. Productivity of the catalyst in g of polymer obtained per g of catalyst used per hour
Branches >CH$_3$/1000 C<10 000 means side chain branches larger than CH$_3$ per 100° C. in molar masses less than 10 000 g/mol, in the tables ethyl or butyl side chain branches
Branches >CH$_3$/1000 C means side chain branches larger than CH$_3$ per 100° C., in the tables ethyl or butyl side chain branches
Polymer ex. means polymer from example Preparation of the Individual Components Example 1

Preparation of 2-methyl-3-(trimethylsilyloxy)cyclopent-2-enone 37.8 g (240 mmol) of hexamethyldisilazane were added to a mixture of 7.8 g (70 mmol) of 2-methylcyclopentane-1,3-dione and 0.29 g (4.4 mmol) of imidazole and the mixture was subsequently heated at 120° C. for 2 hours. The mixture was allowed to cool to room temperature while stirring and all volatile components were distilled off. After distillation at 60-63° C. and 3×10$^{-3}$ mbar, 12.7 g (68 mmol, 98%) of 2-methyl-3-(trimethylsilyloxy)cyclopent-2-enone were obtained as a colorless liquid.

$^1$H NMR (200, 13 MHZ, CDCl$_3$): 0.26 (9H, s, Me$_3$Si); 1.52 (3H, s, Me); 2.47-2.34 (4H, m, CH$_2$).

$^1$H NMR (50, 1 MHZ, CDCl$_3$): 0.0 (Me$_3$Si); 5.3 (Me); 25.6 (CH$_2$); 32.9 (CH$_2$); 120.1 (C$_{alkene}$); 180.9 (C$_{alkene\text{-}OTMS}$), 205.9 (C—O).

1.2. Preparation of 2-methyl-3-(8-quinolyl)cyclopent-2-enone

A mixture of 38.7 g (186 mmol) of 8-bromoquinoline in 250 ml of tetrahydrofuran was cooled to −80° C. and 74.4 ml of n-butyllithium (2.5 M in hexane, 186 mmol) were subsequently added while stirring. The mixture was stirred for a further 15 minutes and, while stirring, 49.9 g (186 mmol) of 2-methyl-3-(trimethylsilyloxy)cyclopent-2-enone were added. The mixture was allowed to warm to room temperature while stirring and was stirred for a further one hour. The reaction mixture was then hydrolyzed by means of a mixture of 40 g of ice and 30 ml of concentrated hydrochloric acid and the mixture obtained in this way was refluxed for 3 hours. The mixture was allowed to cool to room temperature while stirring and ammonia solution was added until the pH was 12. The aqueous phase was then separated off from the organic phase and the aqueous phase was extracted twice with diethyl ether. The organic phases were combined, dried over magnesium sulfate, filtered and the solvent was distilled off. The residue obtained in this way was distilled at 119-139° C. and 2×10$^{-2}$ mbar to give 31.1 g (139.3 mmol, 74.9%) of 2-methyl-3-(8-quinolyl)cyclopent-2-enone.

$^1$H NMR (200, 13 MHZ, CDCl$_3$): 1.69 (3H, t, Me); 2.58 (2H, m, CH$_2$); 3.12 (2H, m, CH$_2$); 7.39 (1H, dd, H$_3$); 7.47-7.60 (2H, m, CH$_{quinolyl}$); 7.82 (1H, dd, CH$_{quinolyl}$); 8.16 (1H, dd, H$_4$); 8.87 (1H, dd, H$_2$).

MS (EI), m/e (%): 223 (8) [M$^+$]; 195 (32) [M$^+$-2CH$_2$]; 180 (100) [M+-2CH$_2$—CH$_3$].

1.3. Preparation of 3-hydroxy-2-methyl-3-phenyl-1-(8-quinolyl)cyclopentene

A mixture of 2.4 g (10.75 mmol) of 2-methyl-3-(8-quinolyl)cyclopent-2-enone with 100 ml of tetrahydrofuran was cooled to −90° C. and 7.2 ml of phenyllithium (1.8 M in cyclohexane/diethyl ether, 12.9 mmol) were subsequently added while stirring. The mixture was stirred at this temperature for another one hour and 1 ml of ethyl acetate was then added. The mixture was then allowed to warm to room temperature while stirring, it was refluxed for 10 minutes and, after it had cooled to room temperature, 100 ml of water were added. The aqueous phase was then separated off from the organic phase and the aqueous phase was extracted twice with diethyl ether. The organic phases were combined, dried over magnesium sulfate, filtered and the solvent was distilled off. The residue was dissolved in 5 ml of toluene and then admixed with 80 ml of hexane. The precipitate which formed was filtered off and dried. This gave 1.874 g (6.22 mmol, 57.9% yield) of 3-hydroxy-2-methyl-3-phenyl-1-(8-quinolyl)cyclopentene.

$^1$H NMR (200, 13 MHZ, CDCl$_3$): 1.48 (3H, m, Me); 2.57 (2H, m, CH$_2$); 2.98 (1H, m, CH$_2$); 3.2 (1H, m, CH$_2$); 4.31 (1H, s, OH); 7.39 (1H, dd, H$_3$); 7.25-7.81 (9H, m, CH$_{quinolyl+phenyl}$); 8.16 (1H, dd, H$_4$); 8.88 (1H, dd, H$_2$).

1.4. Preparation of 2-methyl-3-phenyl-1-(8-quinolyl)cyclopentadiene

A mixture of 5 ml of water and 5 ml of concentrated hydrochloric acid was added to a solution of 1.717 g (5.7 mmol) of 3-hydroxy-2-methyl-3-phenyl-1-(8-quinolyl)cyclopentene in 100 ml of tetrahydrofuran. The mixture was stirred at room temperature for 90 minutes and ammonia solution was then added until the pH was 12. The aqueous phase was then separated off from the organic phase and the aqueous phase was extracted twice with diethyl ether. The organic phases were combined, dried over magnesium sulfate, filtered and the solvent was distilled off. The residue obtained in this way was distilled at 157-170° C. and 2×10$^{-2}$ mbar to give 1.12 g (3.95 mmol, 69.3%) of 2-methyl-3-phenyl-1-(8-quinolyl)cyclopentadiene.

$^1$H NMR (200, 13 MHZ, CDCl$_3$): 1.2 (3H, d, Me); 2.01 (3H, m, Me); 2.10 (3H, m, Me); 3.65 (2H, m, CH$_2$); 3.9 (2H, m, CH$_2$); 4.78 (1H, s, CHMe); 6.58 (1H, m, CpH); 6.64 (1H, m, CpH); 7.01 (1H, m, CpH); 7.03 (1H, m, CpH); 7.23-7.87 (27H, m, CH$_{quinolyl+phenol}$); 8.13-8.22 (3H, m, H$_4$); 8.97-9.05 (3H, m, H$_2$).

1.5. Preparation of (2-methyl-3-phenyl-1-(8-quinolyl)cyclopentadienyl)chromium dichloride

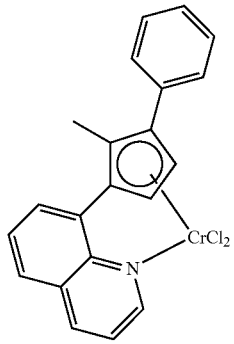

A solution of 1.09 g (3.85 mmol) of 2-methyl-3-phenyl-1-(8-quinolyl)cyclopentadiene in 40 ml of tetrahydrofuran was added to a suspension of 0.157 g (3.85 mmol) of potassium hydride in 20 ml of tetrahydrofuran. After the addition was complete, the reaction mixture was stirred at room temperature for 6 hours and subsequently added to a solution of 1.44 g (3.85 mmol) of chromium trichloride tris(tetrahydrofuran) in 50 ml of tetrahydrofuran while stirring. The mixture was stirred at room temperature for a further 12 hours, the solvent was then distilled off and the residue was washed 3 times with hexane and 3 times with toluene. The soluble components of the residue obtained in this way were taken up in methylene chloride and the solution was filtered. The filtrate was washed free of solvent and dried under reduced pressure. This gave 0.969 g (2.39 mmol) of (2-methyl-3-phenyl-1-(8-quinolyl)cyclopentadienyl)chromium dichloride (62%).

$^1$H NMR (200, 13 MHZ, CDCl$_3$): −53.3 (1H, H$_4$); −16.5 (1H, H$_{5-7}$); 11.2 (3H, Me); 14.8 (1H, H$_5$); 49.4 (1H, H$_3$).

MS (EI), m/e (%): 404 (100) [M+]; 369 (76) [M+-Cl]; 332; (92) [M+-2HCl]; 280 (48) [M+-2HCl—Cr].

Example 2

2.1. Preparation of 3-hydroxy-2-methyl-3-(4-benzotrifluoride)-1-(8-quinolyl)cyclopentene A solution of 3.51 g (15.6 mmol) of 4-bromobenzotrifluoride in 80 ml of tetrahydrofuran was cooled to −90° C. and 6.2 ml of n-butyllithium (2.5 M in hexane, 15.6 mmol) were subsequently added while stirring. After stirring at this temperature for 15 minutes, a solution of 2.9 g (13 mmol) of 2-methyl-3-(8-quinolyl)cyclopent-2-enone (see example 1.2) in 40 ml of tetrahydrofuran was added while stirring. The mixture was stirred at this temperature for another one hour and 1 ml of ethyl acetate was then added. The mixture was allowed to warm to room temperature while stirring and 100 ml of water were subsequently added. The aqueous phase was then separated off from the organic phase and the aqueous phase was extracted twice with diethyl ether. The organic phases were combined, dried over magnesium sulfate, filtered and the solvent was distilled off. The residue was dissolved in 5 ml of toluene and then admixed with 80 ml of hexane. The precipitate which formed was filtered off and dried. This gave 2.69 g (7.28 mmol) of 3-hydroxy-2-methyl-3-(4-benzotrifluoride)-1-(8-quinolyl)cyclopentene. A second fraction was obtained after cooling of the mother liquor (1.42 g, 3.84 mmol, total yield: 85.4%).

$^1$H NMR (200, 13 MHZ, CDCl$_3$): 1.42 (3H, m, Me); 2.52 (2H, m, CH$_2$); 2.98 (1H, m, CH$_2$); 3.18 (1H, m, CH$_2$); 4.10 (1H, s, OH); 7.39 (1H, dd, H$_3$); 7.56-7.84 (7H, m, CH$_{quinolyl+aryl}$); 8.18 (1H, dd, H$_4$); 8.89 (1H, dd, H$_2$).

MS (EI), m/e (%): 369 (9) [M$^+$]; 351 (100) [M$^+$-H$_2$O]; 336 (12) [M$^+$-H$_2$O-Me]; 181 (72) [M$^+$-H$_2$O-Me-quinolyl-CH$_2$].

2.2. Preparation of 2-methyl-3-(4-benzotrifluoride)-1-(8-quinolyl)cyclopentadiene A mixture of 5 ml of water and 5 ml of concentrated hydrochloric acid was added to a solution of 3.61 g (9.8 mmol) of 3-hydroxy-2-methyl-3-(4-benzotrifluoride)-1-(8-quinolyl)cyclopentene in 100 ml of tetrahydrofuran. The mixture was stirred at room temperature for 90 minutes and ammonia solution was then added until the pH was 12. The aqueous phase was then separated off from the organic phase and the aqueous phase was extracted twice with diethyl ether. The organic phases were combined, dried over magnesium sulfate, filtered and the solvent was distilled off. The residue obtained in this way was distilled at 169-176° C. and 2×10$^{-2}$ mbar to give 2.09 g (5.9 mmol, 60.2%) of 2-methyl-3-(4-benzotrifluoride)-1-(8-quinolyl)cyclopentadiene.

$^1$H NMR (200, 13 MHZ, CDCl$_3$): 1.13 (3H, d, Me); 1.97 (3H, m, Me); 2.03 (3H, m, Me); 3.62 (2H, m, CH$_2$); 3.87 (2H, m, CH$_2$); 4.81 (1H, q, CHMe); 6.59 (1H, m, CpH); 6.66 (1H, m, CpH); 7.07 (1H, m, CpH); 7.26 (1H, m, CpH); 7.31-7.88 (24H, m, CH$_{quinolyl+aryl}$); 8.14-8.24 (3H, m, H$_4$); 8.93-9.02 (3H, m, H$_2$).

MS (EI), m/e (%): 351 (100) [M$^+$]; 167 (72) [M$^+$-F$_3$CC$_6$H$_4$—C$_3$H$_3$].

2.3. Preparation of (2-methyl-3-(4-benzotrifluoride)-1-(8-quinolyl)cyclopentadienyl)chromium dichloride

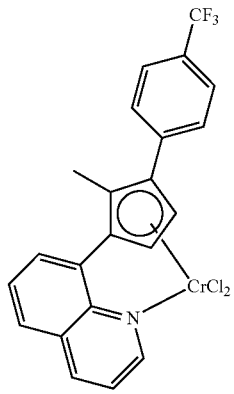

A solution of 2.09 g (5.95 mmol) of 2-methyl-3-(4-benzotrifluoride)-1-(8-quinolyl)cyclopentadiene in 40 ml of tetrahydrofuran was added to a suspension of 0.242 g (5.95 mmol) of potassium hydride in 20 ml of tetrahydrofuran. After the addition was complete, the reaction mixture was stirred at room temperature for 6 hours and subsequently added to a solution of 2.23 g (5.95 mmol) of chromium trichloride tris(tetrahydrofuran) in 50 ml of tetrahydrofuran while stirring. The mixture was stirred for a further 12 hours at room temperature, the solvent was then distilled off and the residue was washed 3 times with hexane and 3 times with toluene. The residue obtained in this way was extracted 3 times with methylene chloride and filtered off. The combined methylene chloride extracts were freed of the solvent, washed and dried under reduced pressure. This gave 1.58 g (3.34 mmol) of (2-methyl-3-(4-benzotrifluoride)-1-(8-quinolyl) cyclopentadienyl)chromium dichloride (56.1%).

$^1$H NMR (200, 13 MHZ, CDCl$_3$): −54.1 (1H, H$_4$); −17.1 (1H, H$_5$); 13.5 (3H, Me); 14.9 (1H, H$_6$); 48.8 (1H, H$_3$).

MS (EI), m/e (%): 472 (100) [M$^+$]; 437 (82) [M$^+$-Cl]; 400 (49) [M$^+$-2HCl]; 380 (22) [M$^+$-2HCl—Cr—HF]; 348 (23) [M$^+$-2HCl—Cr].

Example 4

2,6-Diacetylpyridinebis(2-chloro-6-methylphenyl anil) was prepared as in example 2 of WO 98/27124 and reacted in an analogous manner with iron(II) chloride to give 2,6-diacetylpyridinebis(2-chloro-6-methylphenyl)iron dichloride, as likewise disklosed in WO 98/27124.

Example 5

2,6-Diacetylpyridinebis(2,4-dichloro-6-methylpheny anil)iron dichloride was prepared according to the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solvent was distilled off from the filtrate obtained in this way, the residue was admixed with 200 ml of methanol and subsequently stirred at 55° C. for 1 hour.

The suspension formed in this way was filtered and the solid obtained was washed with methanol and freed of the solvent. This gave 95 g of 2,6-diacetylpyridinebis(2,4-dichloro-6-methylphenyl) in 47% yield. The reaction with iron(II) chloride was carried out as described by Qian et al., Organometallics 2003, 22, 4312-4321.

Example 6

Bis(n-butylcyclopentadienyl)hafnium dichloride is obtainable from Crompton.

Example 7

[1-(8-quinolyl)indenyl]chromium(III) dichloride was prepared as described in WO01/12641.
a) Support Pretreatment
XPO-2107, a spray-dried silica gel from Crosfield, was baked at 600° C. for 6 hours.
b) Support Pretreatment
XPO-2107, a spray-dried silica gel from Crosfield, was baked at 600° C. for 6 hours and subsequently admixed with 3 mmol of MAO per g of baked silica gel and the solvent was subsequently removed under reduced pressure.

Preparation of the Mixed Catalyst Systems

Example 8

A mixture of 632 mg (1.042 mmol) of 2,6-diacetylpyridinebis(2,4-dichloro-6-methylphenyl anil)iron dichloride, 4.38 g (8.903 mmol) of bis(n-butylcyclopentadienyl)hafnium dichloride and 188 ml of MAO (4.75 M in toluene, 895 mmol) was stirred at room temperature for 30 minutes and subsequently added while stirring to 147.9 g of the pretreated support material a) and the mixture was stirred at room temperature for a further 2 hours. (Fe+Hf:Al=1:90) The solid was dried under reduced pressure until it was free-flowing. This gave 310.4 g of catalyst which still contained 34% by weight of solvent (based on the total weight and calculated on the basis of complete application of all components to the support).

Example 9

2.9 l of MAO (4.75 M in toluene) was added while stirring to 3.24 kg of the pretreated support material b) suspended in 70 l of toluene. A mixture of 15 g of 2,6-diacetylpyridinebis (2,4-dichloro-6-methylphenyl anil)iron dichloride and 46 g of [1-(8-quinolyl)indenyl]chromium(III) dichloride was added thereto and the mixture was stirred at room temperature for 3 hours. The solid was filtered off, washed twice with toluene and dried under reduced pressure until it was free-flowing.

Example 10

160.6 ml of MAO (4.75 M in toluene, 763 mmol) was added while stirring to 84.8 g of the pretreated support material b) suspended in 700 ml of toluene. A mixture of 560 mg (0.924 mmol) of 2,6-diacetylpyridinebis(2,4-dichloro-6-methylphenyl anil)iron dichloride and 1.35 g (2.84 mmol) of (2-methyl-3-(4-benzotrifluoride)-1-(8-quinolyl)-cyclopentadienyl)chromium dichloride was added thereto and the mixture was stirred at room temperature for 3 hours (Fe+Cr: Al=1:140). The solid was filtered off, washed twice with toluene and dried under reduced pressure until it was free-flowing. This gave 144.4 g of catalyst which still contained 27.6% by weight of solvent (based on the total weight and calculated on the basis of complete application of all components to the support).

Example 11

155.7 ml of MAO (4.75 M in toluene, 739.5 mmol) were added while stirring to 157.2 g of the pretreated support material b) suspended in 1300 ml of toluene. A mixture of 1229 mg (2.028 mmol) of 2,6-diacetylpyridinbis(2,4-dichloro-6-methylphenyl anil)iron dichloride and 2.938 g (6.21 mmol) of (2-methyl-3-(4-benzotrifluoride)-1-(8-quinolyl)cyclopentadienyl)chromium dichloride was added thereto and the mixture was stirred at room temperature for 2 hours (Fe+Cr:Al=1:138). The solid was filtered of, washed with toluene and dried under reduced pressure until it was free-flowing. This gave 306.8 g of catalyst which still contained 34.2% by weight of solvent (based on the total weight and calculated on the basis of complete application of all components to the support).

Mass-spectroscopic analysis indicated: 0.11 g of Cr/100 g of catalyst, 0.04 g of Fe/100 g of catalyst and 16.2 g of Al/100 g of catalyst.

Polymerization of the Catalysts 8-11

The polymerization was carried out in a fluidized-bed reactor having a diameter of 0.5 m. The reaction temperature, output, productivity and the composition of the reactor gas are reported in table 1, and the pressure in the reactor was 20 bar. 0.1 g of triisobutylaluminum per hour were metered in each case. Catalysts employed were the catalysts from Examples 8-11. The properties of the polymers obtained are summarized in table 2.

TABLE 1

| Catalyst from Ex. | Output [g/h] | T(poly) [° C.] | Prod. [g/g of cat] | Ethene [% by volume] | Hexene [% by volume] | $H_2$ [Vol %] |
|---|---|---|---|---|---|---|
| 8 | 3.5 | 94 | 1807 | 41.97 | 0.17 | — |
| 9 (1st) | 3 | 94.4 | 639 | 35.78 | 1.68 | 0.62 |
| 9 (2nd) | 2.7 | 94 | 504 | 32.27 | 1.65 | 1.61 |
| 10 | 3.4 | 94 | 798 | 33.46 | 1.94 | 0.42 |
| 11 | 3.1 | 93.9 | 623 | 30.63 | 1.98 | — |

Comparative Example 1

ES70X, a spray-dried silica gel from Crossfield, was baked at 600° C. for 6 hours and subsequently admixed with 3 mmol of MAO per g of baked silica gel. A mixture of 36.2 mg (0.069 mmol) of 2,6-diacetylpyridinebis(2,4,6-trimethylphenyl anil)iron dichloride, 106.3 mg (0.271 mmol) of bisindenylzirconium dichloride (obtainable from Crompton) and 3.87 ml of MAO (4.75 M in toluene, 27.9 mmol) was stirred at room temperature for 20 minutes and added while stirring to 8 g of the pretreated support material suspended in 60 ml of toluene and the mixture was stirred at room temperature for 3 hours ((Fe+Zr):Al(total)=1:140). The solid was filtered off, washed with toluene and dried under reduced pressure until it was free-flowing. Mass spectroscopic analysis indicated: 0.21 g of Zr/100 g of catalyst, 0.03 g of Fe/100 g of catalyst and 11.5 g of Al/100 g of catalyst.
Polymerization 400 ml of isobutane, 30 ml of 1-hexene and 60 mg of triisobutylaluminum were placed in a 1 l autoclave which had made inert by means of argon and, finally, 54 mg of the catalyst solid obtained in example V1 were introduced. Polymerization was carried out for 60 minutes at 90° C. and an ethylene pressure of 40 bar. The polymerization was stopped by releasing the pressure. 90 g of polyethylene were obtained.

Productivity: 1670 g of PE/g catalyst solid. The properties of the polymer obtained are summarized in table 2.

Comparative Example 2

A Ziegler catalyst was prepared as described in example 32 of WO 99/46302. 4.5 g of this Ziegler catalyst were suspended in 20 ml of toluene and stirred with 4.95 ml of MAO (4.75 M in toluene, 23.51 mmol) at room temperature for 30 minutes. The solid was filtered off, washed with toluene and dried under reduced pressure until it was free-flowing. The solid obtained in this way was suspended in 20 ml of toluene, 82.9 mg (0.158 mmol) of 2,6-diacetylpyridinebis(2,4,6-trimethylphenyl anil)iron dichloride were added and the mixture was stirred at room temperature for 1 hour. The solid was filtered off, washed with toluene and dried under reduced pressure until it was free-flowing. This gave 4.6 g of the catalyst.
Polymerization 15 ml of 1-hexene, 500 ml of hydrogen and 2 mmol of triisobutylaluminum were introduced into a 10 l gas-phase autoclave which contained an initial charge of 80 g of polyethylene which had been made inert by means of argon and, finally, 145 mg of the catalyst solid obtained in example C2 were introduced. Polymerization was carried out for 60 minutes at 80° C. and an ethylene pressure of 18 bar. The polymerization was stopped by releasing the pressure. 191 g of polyethylene were obtained. Productivity: 1250 g of PE/g catalyst solid. The properties of the polymer obtained are summarized in table 2.

Comparative Example 3

A Ziegler catalyst was prepared as described in EP-A-739937 and polymerization was carried out in a suspension cascade using ethylene/hydrogen in the 1st reactor and ethylene/1-butene in the 2nd reactor. The product data are shown in table 2.

TABLE 2

| Polymer Ex. | $M_w$ [g/mol] | $M_w/M_n$ | Density [g/cm³] | HLMI [g/10 min] | Vinyl/ 1000 C. | $CH_3$/ 1000 C. | Branches > $CH_3$/1000 C. < 10000 | Branches > $CH_3$/1000 | Mixing quality | ESCR [h] |
|---|---|---|---|---|---|---|---|---|---|---|
| 8 | 115570 | 9.7 | 0.953 | 1.3[b] | 1.25 | 3.8 | 0 | 2 | 2 | 66.5 |
| 9 (1st) | 272635 | 30.8 | 0.952 | 22 | 2.04 | 4.3 | 0.7 | 1.8 | 1.5 | |
| 9 (2nd) | 396569 | 42.4 | 0.952 | 8.4 | 1.97 | 4.5 | 0 | 2.5 | 1 | >200[a] |
| 10 | 313369 | 32.5 | 0.951 | 10 | 1.77 | 4.6 | 0 | 1.7 | 1.5 | >200 |
| 11 | 345442 | 44.9 | 0.953 | 44 | 2.5 | 4.7 | 0 | 1.3 | 1.5 | 130[a] |
| C1 | 265303 | 17.4 | 0.947 | 16 | 0.68 | 2.5 | 1.8 | 2.5 | n.d. | 13 |
| C2 | 188957 | 11.1 | 0.945 | 22 | 0.62 | 7.1 | 1.6 | 5.3 | n.d. | 9.8 |
| C3 | 182012 | 21 | 0.954 | 60 | 0.1 | 5.4 | | n.d. | n.d. | 20 |

[a]ESCR at 80° C.
[b]MI measured using 2.16 kg

The invention claimed is:

1. A polyethylene which comprises ethylene homopolymers and copolymers of ethylene with α-olefins and has a molar mass distribution width $M_w/M_n$ of from 11 to 60, a density of from 0.89 to 0.97 g/cm³, a weight average molar mass $M_w$ of from 5000 g/mol to 700,000 g/mol and has from 0.01 to 20 branches/1000 carbon atoms and at least 0.5 vinyl groups/1000 carbon atoms, wherein a part of the polyethylene having a molar mass of less than 10,000 g/mol has a degree of branching of from 0 to 1.5 branches of side chains larger than $CH_3$/1000 carbon atoms.

2. The polyethylene according to claim 1, wherein 5-50% by weight of the polyethylene having the lowest molar masses have a degree of branching of less than 10 branches/1000 carbon atoms and 5-50% by weight of the polyethylene having the highest molar masses has a degree of branching of more than 2 branches/1000 carbon atoms.

3. The polyethylene according to claim 1 which has from 0.9 to 3 vinyl groups/1000 carbon atoms.

4. The polyethylene according to claim 1 which has an at least bimodal short chain branching distribution.

5. The polyethylene according to claim 1 which has been prepared in a single reactor.

6. The polyethylene according to claim 1 which is a polymer powder.

7. The polyethylene of claim 1 wherein the molar mass distribution width $M_w/M_n$ is from 20 to 40.

* * * * *